(12) United States Patent
Inoue et al.

(10) Patent No.: US 8,534,711 B2
(45) Date of Patent: Sep. 17, 2013

(54) PIPING UNIT FOR TRANSPORTING FUEL

(75) Inventors: Tomoki Inoue, Konan (JP); Masayuki Sasagawa, Kasugai (JP)

(73) Assignee: Tokai Rubber Industries, Ltd., Komaki-shi, Aichi-ken (JP)

( * ) Notice: Subject to any disclaimer, the term of this patent is extended or adjusted under 35 U.S.C. 154(b) by 827 days.

(21) Appl. No.: 12/325,605

(22) Filed: Dec. 1, 2008

(65) Prior Publication Data
US 2009/0293974 A1 Dec. 3, 2009

Related U.S. Application Data

(62) Division of application No. 11/304,386, filed on Dec. 15, 2005, now abandoned.

(30) Foreign Application Priority Data

Dec. 17, 2004 (JP) .................................. 2004-366653
Nov. 28, 2005 (JP) .................................. 2005-342038

(51) Int. Cl.
*B60D 1/62* (2006.01)
(52) U.S. Cl.
USPC .......................................... 285/62; 180/69.4
(58) Field of Classification Search
USPC ............ 285/33, 61, 62, 316, 331; 428/36.91; 248/74.1, 74.2, 74.3, 68.1, 71; 180/69.4, 180/292
See application file for complete search history.

(56) References Cited

U.S. PATENT DOCUMENTS

| 4,932,619 | A | * | 6/1990 | Usui ............................. 248/74.1 |
| 5,470,080 | A | * | 11/1995 | Naka et al. ....................... 463/33 |
| 5,718,957 | A | | 2/1998 | Yokoe et al. |
| 5,967,120 | A | | 10/1999 | Blanton et al. |
| 6,089,277 | A | | 7/2000 | Kodama et al. |
| 6,129,393 | A | | 10/2000 | Kodama et al. |
| 7,044,505 | B2 | | 5/2006 | Takayanagi |

(Continued)

FOREIGN PATENT DOCUMENTS

| JP | 58217892 | 12/1983 |
| JP | 63-285385 | 11/1988 |

(Continued)

OTHER PUBLICATIONS

SAE; Surface Vehicle Recommended Practice; SAEJ2044; The Engineering Society for Advancing Mobility Land Sea Air and Space; Dec. 1997; pp. 1-20.

(Continued)

*Primary Examiner* — James M Hewitt
*Assistant Examiner* — Jay R Ripley
(74) *Attorney, Agent, or Firm* — Andrus, Sceales, Starke & Sawall, LLP

(57) ABSTRACT

Piping unit for transporting a fuel is constructed by connecting a resin tube and a connector for connecting the resin tube to a mating pipe. The connector has a connector body including a retainer holding portion and a retainer for engaging with the mating pipe. The resin tube has a multilayered construction including an inner fuel barrier layer and an outer layer covered with a protective layer. The outer layer has a small outer diameter (od) up to 6 mm, the fuel barrier layer and the outer layer have a wall-thickness (t), and a ratio of the outer diameter (od)/the wall thickness (t) is in a range of 4 to 8.

7 Claims, 23 Drawing Sheets

(56) References Cited

U.S. PATENT DOCUMENTS

| | | | |
|---|---|---|---|
| 2003/0099799 A1 | 5/2003 | Koike et al. | |
| 2004/0126527 A1 | 7/2004 | Martucci et al. | |
| 2005/0003126 A1* | 1/2005 | Ito et al. | 428/36.9 |

FOREIGN PATENT DOCUMENTS

| | | | |
|---|---|---|---|
| JP | 63-285389 | | 11/1988 |
| JP | 63289390 | | 11/1988 |
| JP | 64-7979 | | 1/1989 |
| JP | U 64-7979 | * | 1/1989 |
| JP | 64-55389 | | 4/1989 |
| JP | 4-56281 | | 5/1992 |
| JP | 5164273 | | 6/1993 |
| JP | 06-31877 | | 2/1994 |
| JP | 06-055693 | | 3/1994 |
| JP | 06-071813 | | 3/1994 |
| JP | 06-190913 A | | 7/1994 |
| JP | 06-221486 A | | 8/1994 |
| JP | 796564 | | 4/1995 |
| JP | 7173446 | | 7/1995 |
| JP | 868486 | | 3/1996 |
| JP | 2641683 B2 | | 5/1997 |
| JP | 9217877 | | 8/1997 |
| JP | 1030765 | | 2/1998 |
| JP | 10311461 | | 11/1998 |
| JP | 11-201355 A | | 7/1999 |
| JP | A 11-201355 | * | 7/1999 |
| JP | 11280958 | | 10/1999 |
| JP | 2001108175 | | 4/2001 |
| JP | 2001-208249 | | 8/2001 |
| JP | 2001-311482 | | 11/2001 |
| JP | 2002-18999 | | 1/2002 |
| JP | 2002168379 | | 6/2002 |
| JP | 2002187438 | | 7/2002 |
| JP | 2002228066 | | 8/2002 |
| JP | 2003176762 | | 6/2003 |
| JP | 2003-343782 | | 12/2003 |
| JP | 2004-183538 | | 7/2004 |
| JP | 2004-251319 A | | 9/2004 |
| JP | 2004256080 | | 9/2004 |
| JP | 2004263729 | | 9/2004 |
| JP | 2005-48848 | | 2/2005 |
| JP | 2005507797 | | 3/2005 |
| JP | 2005163738 | | 6/2005 |
| JP | 2005-180662 | | 7/2005 |
| JP | 2005-315362 | | 11/2005 |
| JP | 2005-342038 | | 9/2009 |

OTHER PUBLICATIONS

Topics of Sanoh Industrial Co., Ltd.; Reception Dated Mar. 11, 2010; Mar. 2004.
Excerpts from web site of TI Automotive Company,pfd.; vol. 4, Issue 11; Summer 2004; pp. 5-12.
SAEJ2044; SAE International; Issued: Sep. 2002.
SAEJ2260; SAE International; Issued: Nov. 1996.
Nichias Corporation Company History and Tubing Catalog; Nichias Corporation; Date unspecified.
Junkosha Inc. Company History and Tubing Catalog; Junkosha Inc.; Date unspecified.
Nissei Electric Co., Ltd. Tubing Catalog; Nissei Electric Co., Ltd.; Aug. 2006.
Yodogawa Hu-Tech Co., Ltd. Company History and Tubing Catalog; Yodogawa Hu-Tech Co., Ltd.; Date unspecified.
Iwase Co., Ltd. Company History and Tubing Catalog; Iwase Co., Ltd.; Date unspecified.
Nippon Valqua Industries, Ltd. Tubing Catalog—Catalog No. EC01; Nippo Valqua Industries, Ltd.; Oct. 2008.
Nippon Valqua Industries, Ltd. Tubing Catalog—Catalog No. PA11; Nippo Valqua Industries, Ltd.; May 2005.
Nippon Valqua Industries, Ltd. Tubing Catalog—Catalog No. PA15; Nippo Valqua Industries, Ltd.; Date unspecified.
TES Tubing Catalog; New Generation Tubing; Issued; Jun. 2004.
Publication of Japanese Patent Application JPA58-217892, Dec. 17, 1983.
Yamabe, Taiji, Press-Archive of Daicel-Degussa Ltd., Jan. 5, 2005.
NAFLON Tubing Catalog of NICHIAS Corporation; Dec. 11, 2009.
EXLON PFA Tubing Characteristics; Dec. 11, 2009.
Daikin Industries, Ltd. Corporate News; Mar. 25, 2003.
Appendix of presentation of publications or the like for Patent Application 2005-342038, Dec. 14, 2009.
Nishi Eiichi et al; Development of Multi-layer Tube Using Adhesive ETFE for Automotive Fuel Lines; Publication date unspecified; Published by Asahi Glass Co., Ltd.
English Abstract of JPU64-7979; Published Jan. 17, 1989; Applicants: Fuji Heavy Industries Ltd. and Toyo Plastic Seiko Col., Ltd.
English Abstract of JPU64-55389; Published Apr. 5, 1989; Applicant: Fuji Heavy Industries Ltd.
The Regulator; Quarterly Newsletter published by Walbro Engine Management LLC; Published Summer, 2004; pp. 7-12; p. 7 is relevant to present patent application.
English Abstract of JP 2004183538; publication date Jul. 2, 2004.
English Abstract of JP 2001311482; publication date Nov. 9, 2001.
English Abstract of JPA63-285389 published Nov. 22, 1988 in the name of Daicel-Huls Ltd.
English Abstract of JPA63-285385 published Nov. 22, 1988 in the name of Daicel-Huls Ltd.
English Abstract of JPU4-56281 published May 14, 1992 in the name of Maruyasu Kogyo Co., Ltd.

* cited by examiner

PIPING UNIT FOR TRANSPORTING FUEL

CROSS-REFERENCE TO RELATED APPLICATIONS

The present application is a divisional of co-pending U.S. patent application Ser. No. 11/304,386, filed Dec. 15, 2005, now abandoned, which application is incorporated herein by reference and which application claims priority of Japanese Patent Application No. 2004-366653, filed Dec. 17, 2004, and Japanese Patent Application No. 2005-342038, filed Nov. 28, 2005, which applications are incorporated herein by reference.

BACKGROUND OF THE INVENTION

1. Field of the Invention

The present invention relates to a piping unit installed between an engine and a fuel tank to transport a fuel.

2. Description of the Related Art

Recently, as a control on exhaust emissions is tighten, a fuel injection system (injection system) of high fuel efficiency has been employed even in a compact vehicle with a small engine such as mini-vehicle, two-wheeled motor vehicle, three-wheeled motor vehicle, and all-terrain vehicle (ATV).

In this fuel injection system, a fuel is prepressurized, and the prepressurized fuel is injected only when a valve of an injector (fuel injection nozzle) is open. So, piping for transporting a fuel is required to have a pressure resistance of 0.25 to 0.35 MPa.

Therefore, when a rubber hose is used for piping, it is necessary to connect the rubber hose to a mating pipe by swaging a metal fitting onto an end portion of the rubber hose. In this case, there is a problem that this results in high production cost as well as troubles.

And, if the rubber hose is used, as an outer diameter of the rubber hose is large, there is a problem that an operator is considerably constrained from installing a piping unit through between components within a limited tight piping space.

On the other hand, a resin tube also has been conventionally used for transporting a fuel.

When such resin tube is adapted for piping, the resin tube is used in combination with a connector (quick connector) that permits simple and quick connection with a mating pipe.

In the resin tube, it is not necessary to swage a metal fitting onto an end portion of the resin tube for connection with the mating pipe, different from the rubber hose that is used for piping.

The connector of this type is disclosed, for example, in Patent Document 1 below.

FIGS. 11 and 12 show one instance of such connectors as disclosed.

In FIGS. 11 and 12, reference numeral 200 indicates a resin tube, reference numeral 202 indicates a mating pipe to be connected with the resin tube 200.

The mating pipe 202 is formed with an engaging projection (pipe-side engaging portion) 204 projecting annularly on an outer peripheral surface thereof.

Reference numeral 206 indicates a connector that has a connector body (here, entirely made of resin) 208, a retainer 210, a bush 214, and O-rings 212 as sealing member.

The connector body 208 includes a retainer holding portion 216 on one end of the connector body 208 along an axial direction (a proximal end or an axially outer end of the connector body 208), and a press-fit portion 218 on the other end thereof along the axial direction (a distal end or an axially inner end thereof) as connecting portion to the resin tube 200.

The press-fit portion 218 is a portion to be press-fitted or force-fitted within the resin tube 200 in an axial direction. The press-fit portion 218 is formed with annular ribs 220 at a plurality of axially spaced positions on an outer peripheral surface thereof. The annular rib 220 has a saw-edged cross-section and is provided with an acute angled peak.

The press-fit portion 218 is force-fitted within the resin tube 200 and thereby the connector body 208 is connected to such resin tube 200.

At that time, the annular ribs 220 formed on the outer peripheral surface of the press-fit portion 218 bite in an inner surface of an end portion of the resin tube 200 that is diametrically expanded and deformed by force-fitting of the press-fit portion 218, and thereby the resin tube 200 is retained and stopped for preventing withdrawal.

Meanwhile, the press-fit portion 218 is formed with an annular groove wherein an O-ring 222 is retained. The O-ring 222 provides an air-tight seal between the press-fit portion 218 and the resin tube 200.

The above retainer holding portion 216 is a portion for holding the retainer 210 while receiving the retainer 210 therein. The connector body 208 is connected to the mating pipe 202 via the retainer 210.

The retainer holding portion 216 is provided with a stop portion (body-side stop portion) 224 on a trailing end (proximal end or axially outer end) thereof for latching onto the retainer 210.

On the other hand, the retainer 210 is a resin member that is as a whole generally annular, and resiliently or flexibly deformable in a radial direction.

The retainer 210 is formed with an engaging recessed portion or engaging slit portion (retainer-side engaging portion) 225 and a latching recess (retainer-side latching portion) 226. The engaging projection 204 of the mating pipe 202 engages with the engaging recessed portion 225 from radially inward or inside the retainer 210. The latching recess 226 similarly fits to the stop portion 224 of the connector body 208 from radially inward or inside the retainer holing portion 216 to stop the retainer 210 in an axial direction.

The retainer 210 is held in the retainer holding portion 216 in an axially fixed state by latching the latching recess 226 onto the stop portion 224 of the retainer holding portion 216.

The retainer 210 further includes an inner peripheral surface thereof that defines a tapered inner peripheral cam surface 228, and an outer peripheral surface that defines a tapered outer peripheral cam surface 230.

When the mating pipe 202 is inserted inside the retainer 210 in an axial direction, the inner peripheral cam surface 228 abuts and guides the engaging projection 204 for further axial movement. Then the inner peripheral cam surface 228 resiliently diametrically expands the retainer 210 as a whole by the cam action as the engaging projection 204 moves and thereby allows passage of the engaging projection 204.

Then, as soon as the engaging projection 204 reaches a position of the engaging recessed portion 225, the retainer 210 as a whole returns to its original shape, the engaging projection 204 simultaneously is fitted or slipped in the engaging recessed portion 225 in fixed relation with one another in an axial direction.

On the other hand, when the retainer 210 is inserted in the retainer holding portion 216 of the connector body 208 in the axial direction, the outer peripheral cam surface 230 abuts the stop portion 224, thereby resiliently diametrically contracts the retainer 210 as a whole, and latches the latching recess 226 onto the stop portion 224 with diametrically contracting action of the retainer 210.

Meanwhile, the retainer 210 is provided with operation tabs 231 on trailing end portions (proximal end portions or axially outer ends) thereof. The retainer 210 also may be diametrically contracted by exerting a radially inward force to the operation tabs 231.

In the connector 206, the retainer 210 is first held in the retainer holding portion 216 of the connector body 208. Then, in this state, the mating pipe 202 is inserted inside the retainer 210 in the axial direction.

During that time, the retainer 210 is resiliently expanded in a diametrically expanding direction by the engaging projection 204 of the mating pipe 202. As soon as the engaging projection 204 reaches the engaging recessed portion 225, the retainer 210 diametrically contracts, and the engaging projection 204 engages in the engaging recessed portion 225.

On the other hand, the retainer 210 may be first attached to the mating pipe 202. Then, in this state, the mating pipe 202 with the retainer 210 thereon may be inserted in the connector body 208.

During that time, the retainer 210 diametrically contracts once, then, as soon as the latching recess 226 reaches a position of the stop portion 224, the retainer 210 diametrically enlarges to latch the latching recess 226 onto the stop portion 224.

The bush 214 and the O-rings 212 as sealing member are placed and retained, in a distal end of the connector body 208 relative to the retainer holding portion 216. When the mating pipe 202 is inserted within the connector body 208, the O-rings 212, or the O-rings 212 and the bush 214 contact air-tightly with an inserting end portion 232 of the mating pipe 202, namely an outer peripheral surface of a leading end (axially inner end) of the inserting end portion 232 relative to the engaging projection 204 (an outer peripheral surface of a leading end portion of the inserting end portion 232 extending from the engaging projection 204), and provide an air-tight seal between the mating pipe 202 and the connector body 208.

As shown in FIG. 11 (A), two O-rings 212 are used in the connector 206. However, as shown in FIG. 11 (B), as the case may be, single O-ring 212 may be used in the connector 206 for compact sizing of the connector 206.

As understood from the above, the resin tube 200 may be easily connected with the mating pipe 202 by use of such connector 206 with a simple action.

The conventional resin tube 200 here is, for example, about 6 mm in an inner diameter and about 8 mm in an outer diameter, and adapted in a piping system as shown in FIG. 13.

In this piping system, a fuel in a fuel tank 234 is transported (supplied) by a fuel pump 236 through a supply channel 238 under a certain pressure, and injected from an injector 240 to a cylinder 242 of an engine. And, a surplus fuel is returned through a return channel 244 to the fuel tank 234.

For assembling a piping system in a motor vehicle body, the resin tube 200 is first formed or molded in a bent or curved shape according to a predetermined piping layout and attached with connector 206 on each of or one of both ends of the resin tube 200. Then the resin tube 200 with connectors 206 thereon is delivered to an assembling site and assembled in the motor vehicle body on the assembling site.

However, the bent or curved resin tube 200 is obtained, for example, in the following steps. A straight tubular resin tube (a resin tube molded in a straight tubular shape) is fitted in a constraining mold to retain the resin tube in a bent or curved shape, and the resin tube as a whole or the constraining mold is put into an oven to be heated, for example, at a temperature of 150° C. to 160° C. for 20 to 30 minutes to be formed into a bent or curved shape, then, the constraining mold is taken out from the oven, cooled, and the resin tube is removed out of the mold (for example, as disclosed in Patent Document 2). However, many production steps are required or exist in this production method, resulting in increase of the production cost. And, here, the resin tubes 200 corresponding to the type of a motor vehicle, strictly speaking, corresponding to the type of the piping layout is required, and varied types of the resin tube should be produced accordingly. This is also a factor of the cost increase.

However, instead of a piping system (so-called a return fuel system) shown in FIG. 13 where a surplus fuel is returned to the fuel tank 234, another piping system, so-called returnless fuel system where a surplus fuel is not supplied but only a required quantity of the fuel, namely a quantity to be consumed is supplied from the fuel tank 234 to the engine has been increasingly applied recent years.

In the returnless fuel system, only the required quantity of the fuel is supplied. Therefore, if the resin tube 200 with the same diameter as in the piping system shown in FIG. 13 is used in the returnless fuel system, a fuel is likely accumulated. And, the fuel in accumulated state is evaporated in the piping under a certain atmosphere in the engine room, and resultantly, the engine revolutions are liable to be unstable.

In this case, for the resin tube 200, a small-diameter resin tube of an outer diameter up to 6 mm is preferably used in order not to cause accumulation of the fuel.

The resin tube with such small diameter has greater flexibility than a resin tube with large diameter. So, inventors of the present invention devised an assembling structure of a resin tube where the resin tube is not initially formed or molded in a bent or curved shape. The resin tube is formed or molded in a straight tubular shape and attached with a connector on each of or one of the both end portions thereof. Then, the resin tube equipped with the connectors or the connector thereon is delivered in an assembling site, and assembled for piping in a motor vehicle body by bending or curving the resin tube.

In this manner, a cost related to the resin tube may be lowered. And it becomes possible to use a common type of resin tube for various types of motor vehicles or various piping layouts in a versatile manner.

This assembling mode does not apply only to the resin tube with small diameter, but applies to resin tubes with relatively large diameter and excellent flexibility.

However, there is a problem that once a resin tube is broken (kinked) during assembly, the resin tube never returns to normal state and is never usable any more. So, in case where a resin tube is adapted for transporting a fuel, it is required that the resin tube is hard to be broken (buckled or kinked) when bent or curved.

By the way, such connector as described in Patent Document 3 may be used to be attached to an end portion of the resin tube 200. This connector 300 is, as shown in FIGS. 14 and 15, configured such that a relatively thin-walled retainer 302 is mounted on a retainer holding portion 304 in a direction perpendicular to an axis.

The connector 300 has a connector body (here, entirely made of resin) 306 in the form of a tubular shape as a whole, a retainer 302, O-rings 308 as sealing member and a bush 310 (refer to FIG. 14 (A)).

The connector body 306 includes a short cylindrical retainer holding portion 304 on one end of the connector body 306 along an axial direction and a connecting portion 312 on the other end thereof along the axial direction, for example, as connecting portion to the resin tube 200.

The retainer 302 in the form of a looped shape is configured by connecting a pair of engaging portions (retainer-side engaging portions, retainer-side latching portions) 314 integrally to V-shaped bodies 316 at one and the other ends of the engaging portions 314, respectively (refer to FIG. 14 (B)). The retainer 302 is inserted in the retainer holding portion 304 via an opening 318 of the retainer holding portion 304 by narrowing a width of the retainer 302, and then the retainer 302 is returned to its original width (namely its original shape) in the retainer holding portion 304. The retainer 302 is located therein with its original shape.

When a mating pipe 202 (in the form of slightly different shape from the mating pipe 202 shown in FIG. 11) is inserted in the retainer 302, the engaging projection 204 of the mating pipe 202 abuts slant guide surfaces or slant guide cam surfaces 320 of the engaging portions 314. Then the engaging projection 204 pushes the slant guide cam surfaces 320 radially outwardly, and advances while widening the retainer 302. As soon as the engaging projection 204 passes through the engaging portions 314, the retainer 302 is slightly narrowed so that the engaging portions 314 engages with the engaging projection 204 in an axial direction (refer to FIG. 15). Here, the engaging portions 314 enter cutout portions (body-side stop portions) 322 of the retainer holding portions 304 and engage with the retainer holding portion 304 in the axial direction. In this manner, the mating pipe 202 and the retainer 302 or the connector body 306 are securely fixed in the axial direction. And, the mating pipe 202 may be pulled out of the connector 300 by pressing press portions 324 of the retainer 302 radially inwardly, and thereby widening a distance between the engaging portions 314. As shown in FIG. 16, in some case, enclosing portions 326 are formed in the opening 318 so as to rise radially outwardly in order not to allow the press portions 324 to protrude outwardly.

Or, a connector as shown in Patent Document 4 may be also used. This connector 400 is, as shown in FIGS. 17 and 18, configured such that a retainer 402 of a horse-shoe shape is mounted on a retainer holding portion 404 in a direction perpendicular to an axis. The connector 400 is provided further with a checker member 406 for verifying connection to the mating pipe 202.

The connector 400 has a connector body (here, entirely made of resin) 408 in the form of a cylindrical shape as a whole, a retainer 402, O-rings 410 as sealing member, a bush 412 and the checker member 406 (refer to FIGS. 17 and 18(B)).

The connector body 408 includes a short tubular retainer holding portion 404 on one end of the connector body 408 along an axial direction and a connecting portion 414 on the other end thereof along the axial direction, for example, as connecting portion to the resin tube 200.

The checker member 406 is shaped a box and includes a pair of resilient arms 416 and stop recesses 418 on end portions of the resilient arms 416. The checker member 406 is installed on an outer periphery of the retainer holding portion 404 in a direction perpendicular to an axis and is located in the retainer holding portion 404 so as to engage the stop recesses 418 with bottom surface portions 420, respectively.

The retainer 402 includes a pair of detecting lugs 422 and detecting detents 424 on end portions (free end portions) of the detecting lugs 422, and the detecting detents 424 protrude radially inwardly. The retainer 402 is mounted on an outer periphery of the retainer holding portion 404 in the direction perpendicular to the axis and is located in the retainer holding portion 404 so as to protrude the detecting detents 424 inside a passage of the engaging projection 204 of the mating pipe 202 (refer to FIG. 18 (A)).

When the mating pipe 202 is inserted in the connector body 408, the engaging projection 204 advances with pushing away slant guide surfaces or slant guide cam surface 425 and abuts the bush 412 (namely, the mating pipe 202 is correctly connected to the connector body 408), the detecting detents 424 of the retainer 402 are pushed and moved radially outwardly by the engaging projection 204, engagement of the detecting detents 424 and dents 430 of receiving slots 428 is cancelled, and thereby the retainer 402 is allowed to be further pushed in the direction perpendicular to the axis. When the retainer 402 is further pushed in the direction perpendicular to the axis, engaging portions (retainer-side engaging portions) 431 of the retainer 402 engage with the engaging projection 204 of the mating pipe 202, and simultaneously, the resilient arms 416 of the checker member 406 are moved by guide lugs 432 of the retainer 402, the stop recesses 418 of the resilient arms 416 are pushed radially outwardly, and thereby engagement of the stop recesses 418 and the bottom surface portions 420 is cancelled. In this manner, the mating pipe 202 and the connector body 408 are securely fixed together in the axial direction. In this securely fixed relation, the checker member 406 is allowed to separate from the connector body 408. That is, only when the mating pipe 202 is connected to the connector 400 correctly, the checker member 406 can be removed from the connector body 408. Meanwhile, the retainer 402 engages with restraining flanges 434, 436, 438 (body-side stop portions) of the connector body 404 at a rear end surface, middle recessed portions and a front end surface (retainer-side engaging portions) of the retainer 402 in an axial direction.

Patent Document 1 JP-A, 11-201355
Patent Document 2 JP-A, 6-190913
Patent Document 3 JP-B, 2641683
Patent Document 4 JP-A, 2004-251319

SUMMARY OF THE INVENTION

Under the circumstances described above, it is an object of the present invention to provide a novel piping unit having a resin tube as an essential element. For example, the piping unit can be easily connected to a mating pipe without need of metal fittings to be swaged for connecting to the mating pipe during assembly of the piping unit to a motor vehicle body. And, for example, the resin tube is hard to be broken when a bending force is exerted thereto.

A piping unit according to the present invention is arranged between an engine and a fuel tank for transporting a fuel. The piping unit comprises a resin tube as an essential element for the piping unit, and a connector attached to an end portion of the resin tube for connecting the resin tube to a mating pipe. The connector has a connector body including a retainer holding portion on a proximal end (one end along an axial direction) of the connector body and a tube connecting portion or a connecting portion on a distal end (the other end along the axial direction) of the connector body for connecting to the resin tube, a retainer held in or on the retainer holding portion for engaging with the mating pipe to securely fix the connector body in the axial direction, and a sealing member contacting air-tightly with an outer peripheral surface of the mating pipe to provide a seal between the connector body and the mating pipe. The resin tube has a multilayered construction including an inner fuel barrier layer and an outer layer made of polyamide (PA) covered further with a protective layer on an outer peripheral surface or an outer side of the outer layer. The resin tube inside the protective layer (the resin tube excluding the protective layer, or a tube body excluding the protective layer from the resin tube) has a small outer diameter (od) up to 6 mm and a wall thickness (t), and a ratio of the outer diameter (od) to the wall thickness (t) (wall-thickness ratio), namely the outer diameter (od)/the wall thickness (t) of the resin tube inside the protective layer is in a range of 4 to 8.

The connector body may be provided, for example, with a socket like retainer holding portion on one end along an axial direction or one end portion along the axial direction, and a connecting portion for connecting to a resin tube on the other end or the other end portion.

For example, the fuel barrier layer may be made of ethylene-tetrafluoroethylene (ETFE).

For example, a main constituent of the fuel barrier layer may be a material selected from a group consisting of ethylene-tetrafluoroethylene (ETFE), thermoplastic polyester elastomer (TPEE), polybutylene terephthalate (PBT), polybutylene naphthalate (PBN), polyphenylene sulfide (PPS), polyethylene (PE), polypropylene (PP), polyvinylidene fluoride (PVDF), and polyethylene vinyl alcohol (EVOH).

For example, the resin tube may be attached to the connectors at both end portions of the resin tube by force-fitting or press-fitting, or solvent welding.

For example, a checker member may be formed or mounted on the connector. The checker member may be configured removable, namely may be disengageable from the connector when the mating pipe is connected to the connector correctly.

For example, a closing member may be mounted on the connector for closing a connecting opening thereof before the mating pipe is connected to the connector.

For example, the piping unit may be used for piping in a returnless fuel system in which the fuel is supplied from the fuel tank to an injector of the engine, but is not returned from the injector to the fuel tank.

As stated above, according to the present invention, the piping unit is constructed by combining a connector with a resin tube including an inner fuel barrier layer and an outer layer of PA. The outer layer of PA is covered with a protective layer. The connector is adapted for connecting the resin tube with a mating pipe, and has a connector body, a retainer and a sealing member. The resin tube inside the protective layer (a tube or tube body excluding the protective layer from the resin tube) has a small outer diameter (od) up to 6 mm, and a ratio of the outer diameter (od) of the resin tube (the tube or tube body excluding the protective layer from the resin tube)/a wall thickness (t) of the resin tube (the tube or tube body excluding the protective layer from the resin tube) is in a range of 4 to 8. According to the piping unit of the present invention, an operator can easily connect the mating pipe and the resin tube by means of a connector with a little labor. And, as will be described later, even if a bending force is exerted on the resin tube, the resin tube can be effectively prevented from being broken by limiting the ratio of the outer diameter (od) to the wall-thickness (t) within the above range (4 to 8). So, the operator can easily assemble the piping unit in a motor vehicle body while bending the resin tube.

Specifically, the operator has to securely fix the resin tube to the motor vehicle body with a fixing clamp while bending the resin tube according to a predetermined piping layout, through between various components equipped in the motor vehicle body, within a narrow, limited piping space. At that time, in some case, the resin tube is securely fixed by the fixing clamp while changing the resin tube from a gentle bent shape to a steep bent shape, namely changing a curvature of the resin tube from a large radius shape to a small radius shape. And, in some case, on the contrary, the resin tube is securely fixed while changing the resin tube or loosening a bent shape of the resin tube from a small radius shape to a large radius shape. If both of the piping manners is adaptable in assembling a piping unit to a motor vehicle body, the operator can easily install the piping unit, namely the resin tube along a piping route.

For that purpose, it is preferred that the resin tube is not broken (buckled, kinked) while the resin tube is bent at a predetermined curvature radius, specifically at curvature radius (R) up to 50 mm, or more preferably at curvature radius (R) up to 30 mm.

It is confirmed that when the resin tube has a ratio of the outer diameter (od) to the wall-thickness (t) (wall-thickness ratio), namely the outer diameter (od)/the wall thickness (t) within a range of 4 to 8 according to the present invention, the resin tube may be favorably arranged and assembled while being bent, without causing such breakage.

Therefore, a piping unit according to the present invention, which is constructed in combination of a resin tube and a connector, may be easily assembled in a motor vehicle body.

Here, the retainer to be installed on the connector or the connector body is formed separately from the connector body or unitary with the connector body, and is configured to be resiliently or flexibly deformable in a radial direction. The retainer may have a retainer-side latching portion. The retainer may also have a cam surface (guide surface or abutment surface) or an inner peripheral cam surface (inner peripheral guide surface or inner peripheral abutment surface) for resiliently diametrically expanding the retainer at insertion of a mating pipe in the retainer, and/or a cam surface (guide surface or abutment surface) or an outer peripheral cam surface (outer peripheral guide surface or outer peripheral abutment surface) for resiliently diametrically contracting the retainer at insertion of the retainer in the retainer holding portion. For example, the retainer-side latching portion is latched onto and securely fixed to a body-side stop portion in an axial direction by fitting on the body-side stop portion, for example, from radially inward or inside the retainer holding portion. The body-side stop portion is formed, for example, on a side of the retainer holding portion.

According to the present invention, the resin tube is a small-diameter tube with outer diameter up to 6 mm, and has a high flexibility. As described above, thanks to the flexibility, the operator can easily assemble a piping unit in the motor vehicle body according to a predetermined piping layout with use of fixing clamps while bending the resin tube. And, by limiting a relationship of the outer diameter (od) to the wall-thickness (t) of the resin tube within the above range, it may be prevented, for example, that the resin tube is broken when the piping unit is assembled.

According to the present invention, for example, fluorine resin such as ETFE may be used for the above fuel barrier layer. The fluorine resin is excellent in a fuel barrier property and processability, therefore, suitable for the fuel barrier layer.

Here, the fuel barrier property means impermeability to a fuel (gasoline) and resistance to inferior gasoline (inferior gasoline is gasoline mixed with ethanol, methanol, toluene or the like that causes a crack in an inner surface of a resin tube).

Or, the fuel barrier layer may be made by using a material selected from a group consisting of ETFE, TPEE, PBT, PBN, PPS, PE, PP, PVDF, and EVOH as a main constituent, and satisfactory or sufficient effects may be expected also in such fuel barrier layer.

In the present invention, for example, the above resin tube may be attached to the connectors at both end portions of the resin tube by force-fitting, press-fitting or solvent welding.

In this case, it is not necessary to swage a metal fitting or the like on the resin tube for connecting the resin tube with the mating pipe. This allows the operator to connect the resin tube with the mating pipe very easily without difficulty in a limited tight space.

And, according to one aspect of the present invention, a checker member may be formed or mounted in or on the connector. The checker is configured removable or disengageable from the connector when the mating pipe is connected to the connector correctly.

In this configuration or aspect, it is not necessary to verify connection of the connector with the mating pipe visually or by visual observation. and it is possible to verify its connection by removing the checker member from the connector or collecting the checker members. Here, even in case where connecting work is done for a place beyond the operator's view such as a remote part in the motor vehicle body, the operator can easily verify a correct connection.

According to one aspect of the present invention, a closing member may be mounted in the connector for closing a connecting opening of the connector before the mating pipe is connected to the connector. In this manner, it may be favorably prevented by the closing member that dust or other foreign substance enters inside the resin tube through the connector.

Here, the connectors may be attached to both end portions of the resin tube, and the closing member may be mounted in each of the connectors. And, when one closing member is removed from one of the connectors on both ends of the resin tube and only the other closing member is left on the other of the connectors, the operator can easily verify whether there is leakage at a joint area (connecting area) between the connector and the resin tube or in the piping unit by exerting a pressure inside the resin tube through an open end of the one connector.

The piping unit of the present invention is specifically suitable for piping in a returnless fuel system in which the fuel is supplied from a fuel tank to an injector of an engine, but is not returned from the injector to the fuel tank.

Further, for the resin tube of the present invention, a small diameter resin tube with outer diameter up to 6 mm is adapted. When such small diameter tube is used for piping of a returnless fuel system, a flow velocity of transporting fluid does not become slow. This restrains a temperature increase of a fuel fluid inside the resin tube. Therefore, the resin tube of the present invention is suitably adapted for piping of the returnless fuel system.

Now, the preferred embodiments wherein the present invention is adapted for a piping unit to be arranged between an engine and a fuel tank in a compact vehicle for transporting a fuel will be described in detail with reference to the drawings.

Here, the compact vehicle means specifically a two-wheeled motor vehicle, a three-wheeled motor vehicle, and all-terrain vehicle (ATV) or the like, or a mini-vehicle.

BRIEF DESCRIPTION OF THE DRAWINGS

FIG. 1 (B) is an enlarged view of a part B of FIG. 1 (A).

FIG. 2 (B) is a sectional view showing a state that a resin tube or the piping unit is connected with a mating pipe by means of the connector.

FIG. 4 (B) is a sectional view showing the state that the resin tube is fastened by the fixing clamp.

FIG. 5 (B) is a sectional view taken along B-B line in FIG. 5 (A).

FIG. 9 (B) is an explanatory view of an action when the mating pipe is connected to the connector, and showing a state that the mating pipe is inserted in the connector.

FIG. 9 (C) is an explanatory view of an action when the mating pipe is connected to the connector, and showing a state that an engaging projection of the mating pipe abuts a latching claw of a checker member.

FIG. 9 (D) is an explanatory view of an action when the mating pipe is connected to the connector, and showing a state that the checker member is disengaged from the connector.

FIG. 11 (B) is a view showing an example where single O-ring is used in the connector of FIG. 11 (A).

FIG. 12 (B) is a view of the relevant part of the connector of FIG. 11 along with the resin tube, and showing a state that the connector is force-fitted in the resin tube.

FIG. 14 (B) is a view showing a retainer of the another connector.

FIG. 18 (B) is a sectional view showing a state that the yet another connector is connected to a mating pipe.

DETAILED DESCRIPTION OF THE PREFERRED EMBODIMENTS

Figure 2A:
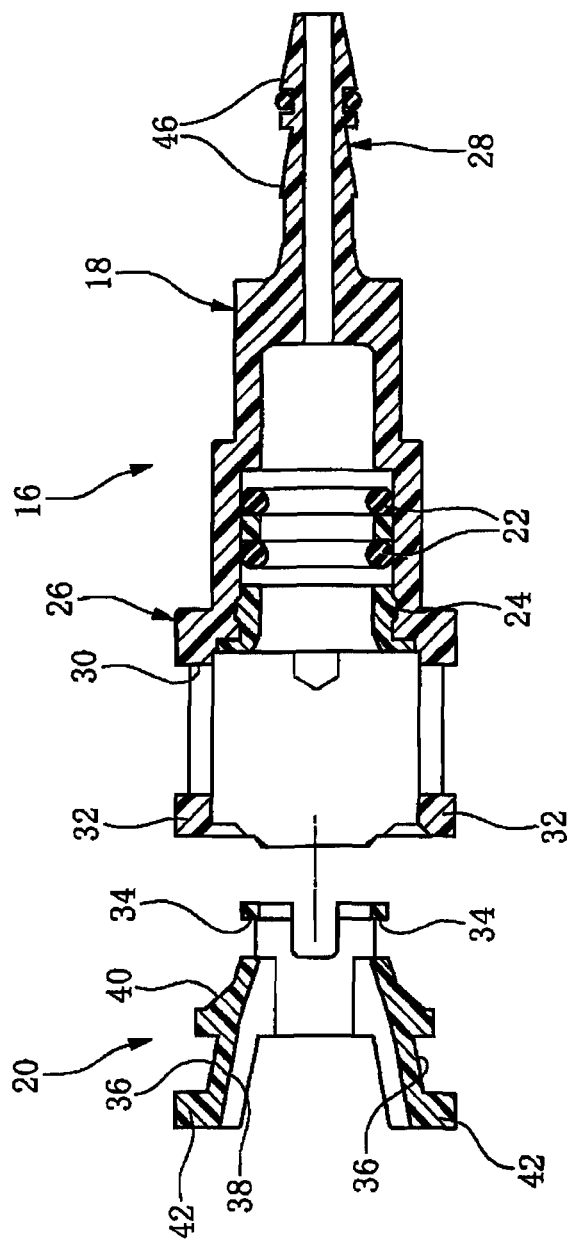
FIG. 2 (A) is a partly exploded sectional view of a connector in the one embodiment.
Figure 2B:
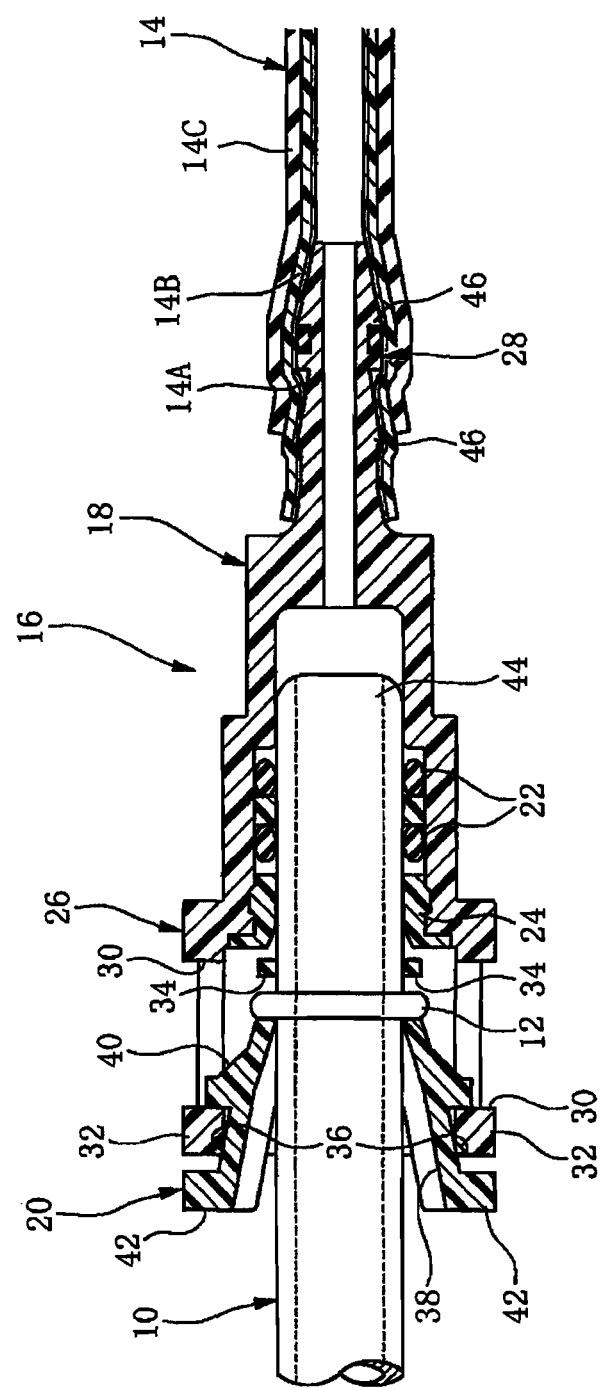

With reference to FIG. 2 (B), reference numeral 10 is a mating pipe that is formed integrally to a component such as an engine or a fuel tank securely fixed to a motor vehicle body. The mating pipe 10 is formed with an engaging projection (pipe-side engaging portion) 12 projecting annularly on and around an outer peripheral surface thereof.

Figure 5A:
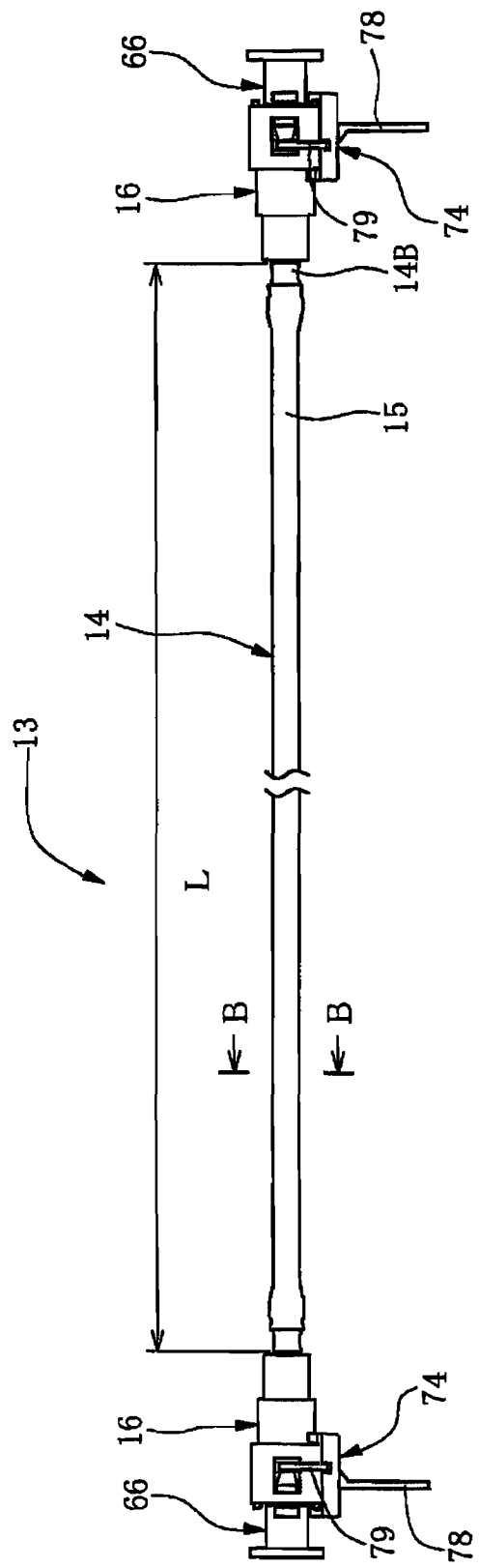
FIG. 5 (A) is a view showing the piping unit of the one embodiment in a state before assembled in the motor vehicle body.

FIG. 5 (A) shows piping unit 13 in a state before assembled in the motor vehicle body. In Figures, reference numeral 14 indicates a resin tube, reference numeral 16 indicates a connector (quick connector). The connectors 16, 16 are attached to both end portions of the resin tube 14. However, when the resin tube 14 is connected directly to a mating member such as the mating pipe 10 on one end portion of the resin tube by force-fitting or the like, the connector 16 is attached only to the other end portion of the resin tube 14.

Here, the resin tube 14 has a straight tubular shape before assembled in or to the motor vehicle body. That is, the resin tube 14 is formed or molded in the straight tubular shape.

Meanwhile, the piping unit 13 is adaptable for a returnless fuel system and for another fuel system where a surplus gasoline is returned to a fuel tank (return fuel system), and specifically suitable for the former, the returnless fuel system.

Figure 4A:
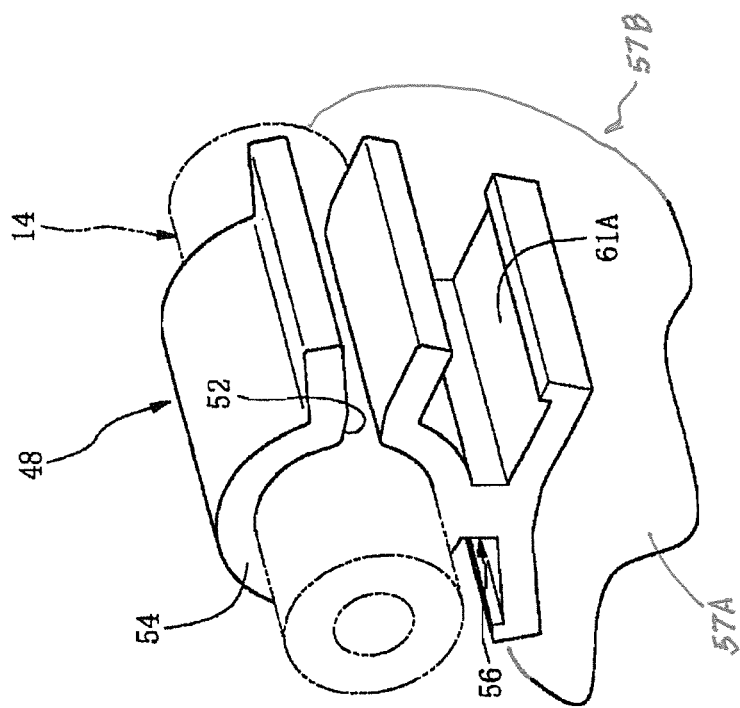
FIG. 4 (A) is a perspective view showing a state that the resin tube is fastened by the fixing clamp.
Figure 4B:
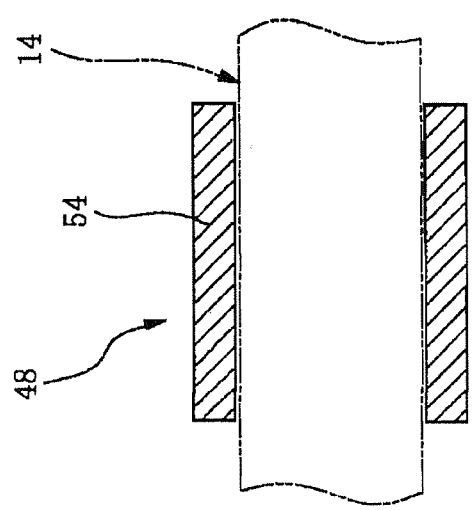
Figure 5B:
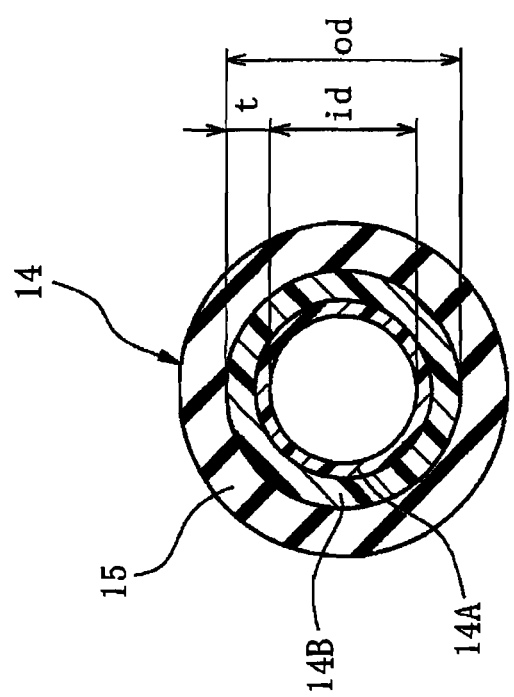

As shown in FIG. 5(B), the resin tube 14 has a multilayered construction that includes a layer of fluorine resin as an inner fuel barrier layer, concretely, a layer 14A of ETFE and an outer layer 14B of PA 12. A protective layer 15 is laminated on an outer peripheral surface of the outer layer 14B in a coating manner along an entire length of the outer layer 14B. The protective layer 15 is made of rubber (here, ethylene propylene diene rubber (EPDM)) to protect the resin tube 14 or the outer layer 14B and prevent the resin tube 14 or the outer layer 14B from being damaged at a portion clamped by a fixing clamp 48 (refer to FIGS. 1, 3 and 4) that will be described later.

In addition, following materials may be used aside from ETFE for a fuel barrier layer 14A. Namely, as for fluorine resin other than ETFE, for example, usable are polyvinylidene-fluoride (PVDF), polyvinyl fluoride (PVF), polychlorotrifluoroethylene (CTFE), ethylene-chlorotrifluoroethylene copolymer (ECTFE), ethylene-tetrafluoroethylene-hexafluoropropylene copolymer, hexafluoropropylene-tetrafluoroethylene copolymer (FEP), polytetrafluoroethylene (PTFE), tetrafluoroethylene-perfluoroalkoxy vinyl ether copolymer (PFA), tetrafluoroethylene-hexafluoropropylene-perfluoroalkoxy ethylene terpolymer, vinylidene fluoride-tetrafluoroethylene copolymer, vinylidene fluoride-hexafluoropropylene copolymer, tetrafluoroethylene-hexafluoropropylene-vinylidene fluoride terpolymer (THV), hexafluoropropylene-perfluoroalkoxy vinyl ether, vinylidene fluoride-chlorotrifluoroethylene copolymer, vinylidene fluoride-perfluoroalkoxy vinyl ether, vinylidene fluoride-tetrafluoroethylene-perfluoroalkoxy vinyl ether, vinylidene fluoride-hexafluoropropylene-perfluoroalkoxy vinyl ether, ethylene-tetrafluoroethylene-perfluoroalkoxy vinyl ether, ethylene-hexafluoropropylene-perfluoroalkoxy vinyl ether, ethylene-tetrafluoroethylene-hexafluoropropylene-perfluoroalkoxy vinyl ether, or the like. However, specifically, ETFE is suitable in view of tube processability, etc.

The above fuel barrier layer 14A may include the above material as main constituent. Besides the above, the fuel barrier layer 14A is preferably made by using a main constituent selected from a group consisting of thermoplastic polyester elastomer (TPEE), polybutylene teraphthalate (PBT), poly-phenylene sulfide (PPS), polyethylene (PE), polypropylene (PP), polybutylene napthalate (PBN), a polyvinylidene fluoride (PVDF), and ethylene-vinyl alcohol copolymer (EVOH).

Or, an alloy material made by using any of these resins as main constituent and improving conductivity, flexibility, shock resistance, etc. may be used for the fuel barrier layer.

In this embodiment, the resin tube 14 is a small diameter tube that has an inner diameter (id) of 2.5 mm, an outer diameter (od) of the outer layer 14B of 4 mm.

Here, the ETFE layer 14A has the inner diameter (id) of 2.5 mm and a wall thickness of 0.2 mm, the PA layer 14B has a wall thickness of 0.55 mm, and the protective layer 15 has a wall thickness of 1.0 mm. Namely, a total of wall-thickness (t) of the ETFE layer 14A as an inner layer and the PA layer (outer layer) 14B is 0.75 mm.

The resin tube 14 is designed to have an overall length L of 200 to 1500 mm.

However, the multilayered construction, material and dimension such as wall thickness and length are given by way of example. Needless to say, these may be modified variously.

Figure 6:
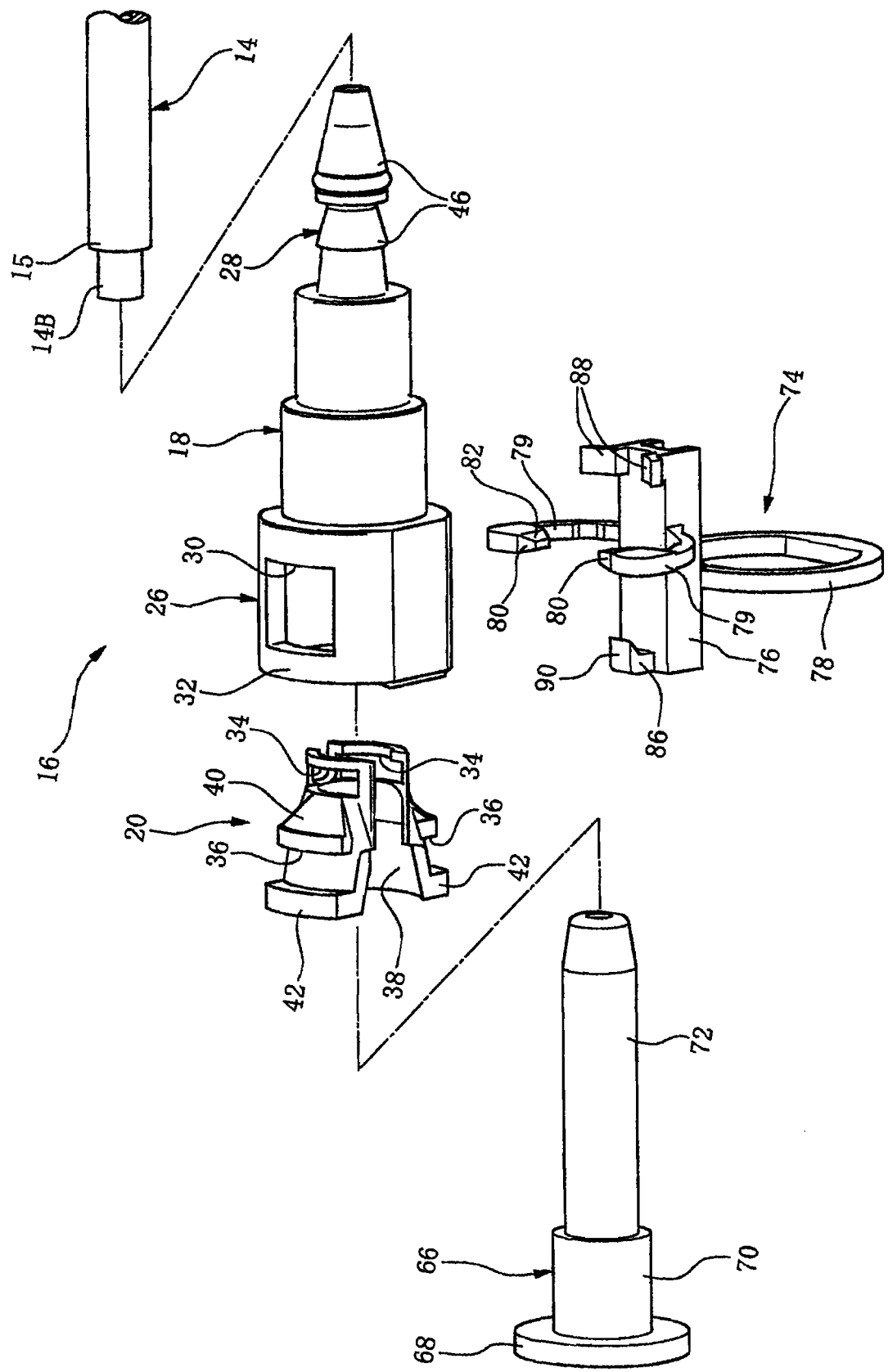
FIG. 6 is an exploded perspective view of a relevant part of FIG. 5 (A).

As shown in FIG. 2, the connector 16 has a connector body (here, entirely made of resin) 18 of a tubular shape as a whole, a retainer 20, a bush 24 and O-rings 22, 22 as sealing member (also refer to FIG. 6). For example, the O-ring 22 functions as sealing member, while the bush 24 functions not as sealing member but as stop against lateral wobbling with respect to an axis.

In this embodiment, the connector 16 is made of PA (except the sealing member). However, the material for the connector 16 is selectable suitably in view of heat resistance, fuel impermeability, gasoline resistance (resistance to swelling in gasoline) and cost.

Specifically, polyamide type (PA11, PA12, P6, PA66, polyphtalamide (PPA), etc.) and polyphenylene sulphide (PPS) or the like are excellent in heat resistance, and polyester type (polybutylene terephthalate (PBT), polyethylene terephthalate (PET), polyethylene naphthalate (PEN), etc.) is excellent in fuel impermeability and resistance to gasoline.

And, polyacetal (POM) is available at relatively low cost while securing heat resistance, fuel impermeability, and resistance to gasoline.

And, glass fiber may be added in the above materials to enhance strength or nanocomposite material such as clay may be added in the above materials to improve the fuel impermeability.

These materials are also suitable for a material for the resin tube 14. For the material of the resin tube 14, an alloy of elastomer and one of these resin materials may be used. Such alloy may provide the resin tube 14 with flexibility in addition to heat resistance and fuel impermeability inherent in resin itself.

The above connector body 18 has a socket like retainer holding portion 26 on an proximal end thereof and a press-fit or force-fit portion (nipple portion) 28 on a distal end thereof as a connecting portion to the resin tube 14, as shown in FIG. 2.

The retainer holding portion 26 is a portion for receiving and holding the retainer 20 therein. The connector body 18 is connected to the mating pipe 10 via the retainer 20.

The retainer holding portion 26 is formed with a pair of opening windows 30, 30 and stop portions (body-side stop portions) 32, 32 on a trailing end thereof for being latched in the retainer 20. The pair of opening windows 30, are disposed in a diametrically symmetrical positions with each other.

And, the retainer 20 is a member of generally annular shape (here, C-shape in section) as a whole and made of resin. The retainer 20 is designed resiliently and flexibly deformable in a radial direction.

The retainer 20 has engaging recessed portions or engaging slit portions (retainer-side engaging portions) 34, 34 and latching recesses (retainer-side latching portions) 36, 36. The engaging projection 12 of the mating pipe 10 engages with the engaging recessed portion 34 from radially inward or inside the retainer 20 to be securely fixed in an axial direction, while the latching recess 36 similarly fits to or latches onto the stop portion 32 of the connector body 18 from radially inward or inside the retainer holding portion 26 to stop the retainer 20 in the axial direction.

The retainer 20 is held by the retainer holding portion 26 in fixed relation in the axial direction while latching the latching recess 36 onto the stop portion 32 of the retainer holding portion 26.

The retainer 20 further includes an inner peripheral surface that defines a tapered inner peripheral cam surface or tapered inner peripheral guide surface 38, and an outer peripheral surface that defines a tapered outer peripheral cam surface or tapered outer peripheral guide surface 40.

The inner peripheral cam surface 38 abuts the engaging projection 12, and guides the engaging projection 12 for axial movement when the mating pipe 10 is inserted inside the retainer 20 in the axial direction. As the engaging projection 12 moves, the inner peripheral cam surface 38 resiliently diametrically enlarges the retainer 20, for example, as a whole under camming action or guiding action so as to allow passage of the engaging projection 12.

Then, as soon as the engaging projection 12 reaches a position of the engaging recessed portion 34, the retainer 20 returns to its original shape as a whole, and simultaneously, the engaging projection 12 is fitted in the engaging recessed portions 34, 34 in fixed relation with one another in an axial direction.

On the other hand, when the retainer 20 is inserted in the retainer holding portion 26 of the connector body 18 in the axial direction, the outer peripheral cam surface 40 abuts the stop portions 32, 32, thereby resiliently diametrically contracts the retainer 20, for example, as a whole, and finally latches the latching recesses 36, 36 onto the stop portions 32, 32, respectively.

The retainer 20 includes operation tabs 42, 42 on trailing end portions (proximal end portions or axially outer ends) thereof. The retainer 20 may also be diametrically contracted by exerting a force to the operation tabs 42, 42 radially inwardly.

In the connector 16, the retainer 20 is first held in the retainer holding portion 26 of the connector body 18, and in this state, the mating pipe 10 is inserted inside the retainer 20 in the axial direction.

During that time, the retainer 20 is resiliently expanded in a diametrically expanding direction by the engaging projection 12 of the mating pipe 10. And, as soon as the engaging projection 12 reaches the engaging recessed portions 34, 34, the retainer 20 diametrically contracts and the engaging projection 12 engages in the engaging recessed portion 34.

Alternatively, the retainer 20 is first attached to the mating pipe 10, and in this state, the mating pipe 10 with the retainer 20 thereon may be inserted in the connector body 18.

At that time, the retainer 20 once diametrically contracts, and then, as soon as the latching recess 36 reaches positions of the stop portions 32, 32, the retainer 20 diametrically expands and the latching recess 36 latches onto the stop portions 32, 32.

The bush 24 and the above O-rings 22, 22 as the sealing member are equipped and held inside a distal end or leading end of the connector body 18 relative to the retainer holding portion 26. As soon as the mating pipe 10 is inserted in the connector body 18, the O-rings 22, 22 or the O-rings 22, 22 and the bush 24 contact air-tightly an inserting end portion 44 of the mating pipe 10, namely an outer peripheral surface of a leading end of the inserting end portion 44 relative to the engaging projection 12 (or an outer peripheral surface of a leading end of the mating pipe 10 extending from the engaging projection 12 in a leading direction (traveling direction) of the mating pipe 10) to provide an air-tight seal between the mating pipe 10 and the connector body 18.

The force-fit portion 28 is a portion to be force fitted or press fitted inside the resin tube 14 in the axial direction. The force-fit portion 28 is formed with annular ribs 46 at a plurality of axially spaced positions on an outer peripheral surface thereof. The annular rib 46 has a saw-edged cross-section and is provided with an acute angled peak.

The connector body 18 is stopped relative to the resin tube 14 by force fitting the force-fit portion 28 in an end of the resin tube 14.

Figure 1A:
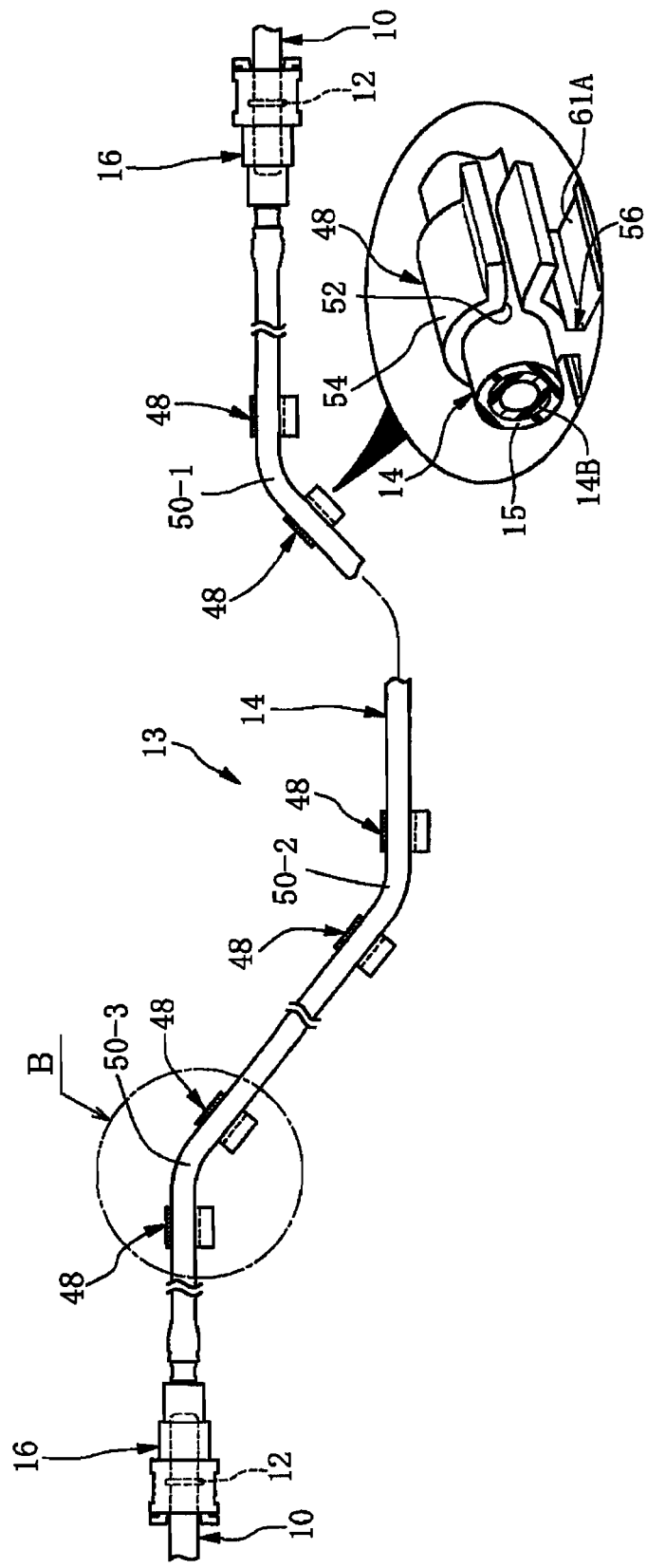
FIG. 1 (A) is a view showing a piping unit according to one embodiment of the present invention in an assembled state in a motor vehicle body.
Figure 1B:
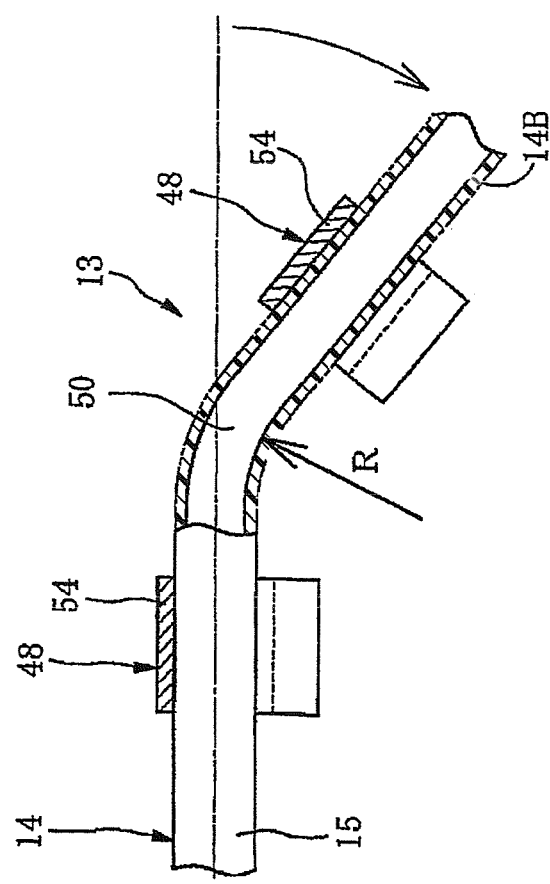

FIGS. 1 (A) and 1 (B) show a state that the above piping unit 13 is assembled in a motor vehicle body.

As shown in the figures, here, the resin tube 14 is bent or curved in arcuate shape at a plurality of points (here, three bent points 50-1, 50-2, 50-3 are shown) along a longitudinal direction based on its flexibility. Both side portions of each of the plurality of the bent points 50-1, 50-2, 50-3 are held and fastened to the motor vehicle body by fixing clamps 48, 48.

In this manner, the resin tube 14 with connectors 16, 16 thereto is entirely provided with bends or bent portions as predetermined. And the resin tube 14 in this state is assembled in the motor vehicle body while being connected with the mating pipes 10 via the connectors 16, 16.

That is, the resin tube 14 that is initially formed in straight tubular shape is arranged and assembled in the motor vehicle body while being restrained and retained in bent shape as desired by the fixing clamps 48, 48.

Figure 3:
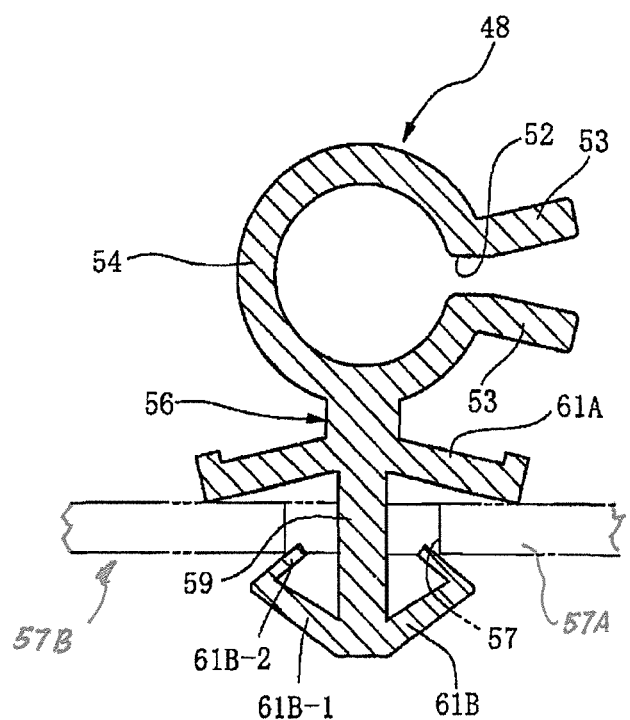
FIG. 3 is a view of a fixing clamp in the one embodiment.

FIGS. 3 and 4 show a preferred embodiment of the fixing clamp 48. Here, FIG. 3 shows the fixing clamp 48 before fixed to a panel 57A of the motor vehicle body 57B, while FIG. 4 shows the fixing clamp 48 after fixing thereto.

In FIG. 3, the fixing clamp 48 is made of resin, and is flexible or resilient. The fixing clamp 48 has a holding portion 54 and a mounting portion 56. The holding portion 54 is formed in annular shape as a whole, and provided with an opening 52 in a predetermined circumferential position thereof. The holding portion 54 includes a pair of guide duck bill portions 53, 53 projecting outwardly, on both ends of the opening 52. Thereby the holding portion 54 is in a form of generally C-shape. The mounting portion 56 has an insert portion 59 for a holding bore 57 in the panel 57A of a side of the motor vehicle body 57B, and a pair of pinching portions 61A, 61B for pinching the panel from inside and outside the panel. The pinching portion 61A is formed integrally on an outer end portion of the mounting portion 56 or the insert portion 59 (an end portion of the mounting portion 56 or the insert portion 59 near the holding portion 54) so as to extend in both lateral directions (both laterally outward directions, in right and left directions in FIG. 3), while the pinching portion 61B is formed integrally on an inner end portion of the mounting portion 56 or the insert portion 59 (an end portion of the mounting portion 56 or the insert portion 59 opposite to the holding portion 54) so as to extend in the both lateral directions. The pinching portion 61B integrally includes foot portion 61B-1 that extends laterally outwardly and is angled toward the holding portion 54 on both lateral sides, and turned-back portion 61B-2 that extends in laterally inward directions from laterally outer ends of the foot portion 61B-1 and is angled toward the holding portion 54. A distance between laterally outer ends of the pinching portion 61A is sufficiently greater than a width of the holding bore 57, and a distance between laterally outer ends of the pinching portion 61B (a distance between laterally outer ends of the foot portion 61B-1) is slightly greater than the width of the holding bore 57.

As shown in FIG. 4 (A), in the fixing clamp 48, the resin tube 14 is slipped in the holding portion 54 via the opening 52 in a direction perpendicular to an axis while resiliently widening the holding portion 54, and thereby the resin tube 14 is held by the holding portion 54. Then the fixing clamp 48 is securely fixed to the motor vehicle body in the holding bore 57, and thereby the resin tube 14 is in fixed relation to the motor vehicle body. The fixing clamp 48 is securely fixed thereto, for example, in a following manner. The insert portion 59 is inserted in the holding bore 57 of a panel such that the pinching portion 61B is force-fitted within the holding bore 57 while being narrowed or deformed laterally inwardly, and until the pinching portion 61B completely or generally completely passes through the holding bore 57 on to a rear side of the panel. In this mounted state, laterally outer end portions of the pinching portion 61A engage with a surface of the panel, while the turned-back portion 61B-2 of the pinching portion 61B engages with an edge or an inner edge of the holding bore 57. Accordingly, the fixing clamp 48 is mounted stably in the panel. On the other hand, it is carried out smoothly to insert the fixing clamp 48 in the holding bore 57 and it is possible to pull the fixing clamp 48 out of the holding bore 57.

Figure 7:
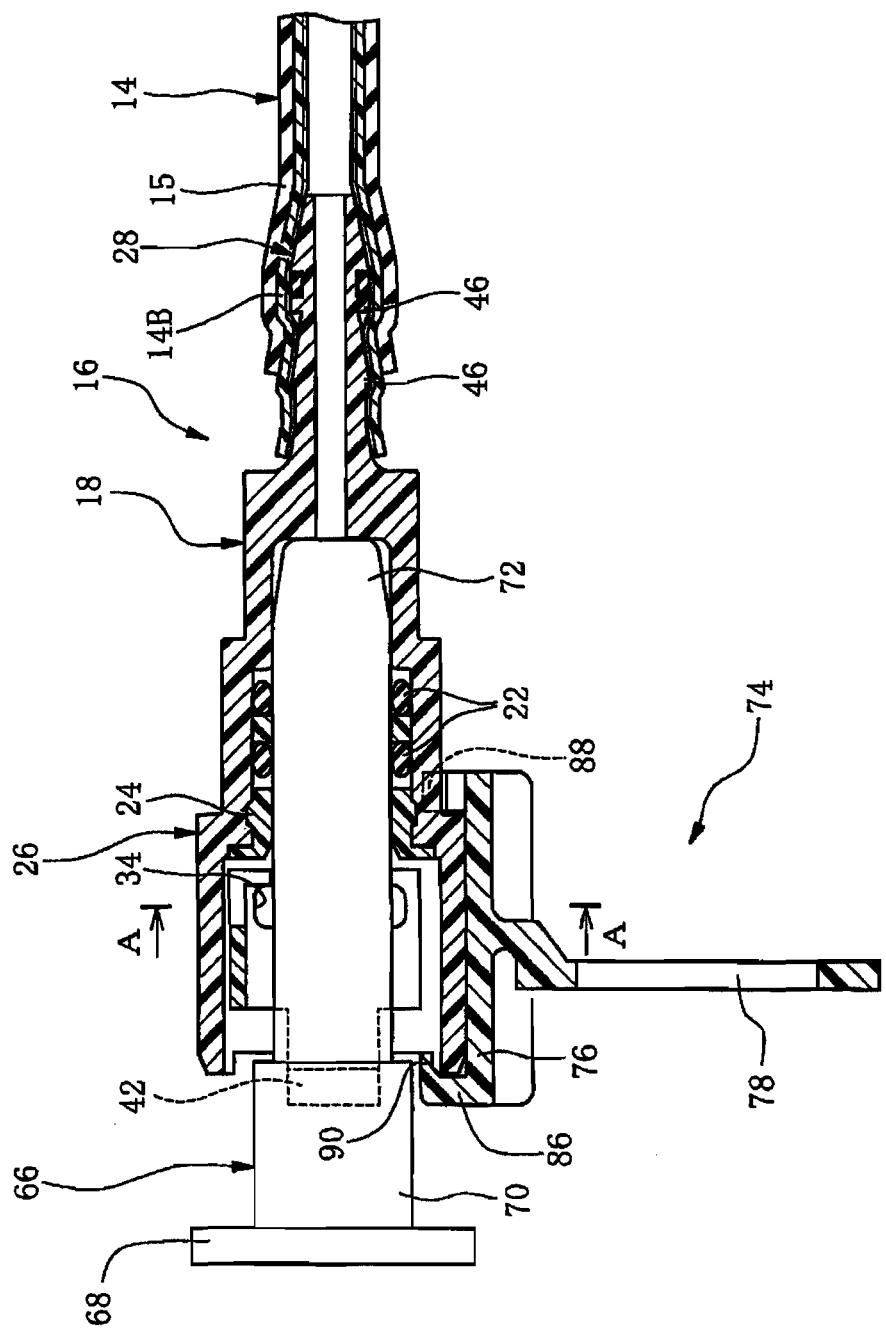
FIG. 7 is a sectional view of the relevant part of FIG. 5 (A).

As shown in FIGS. 5 and 7, closing members 66, 66 are mounted to both ends of the piping unit 13, specifically to the connectors 16, 16 on both ends of the piping unit 13, before the piping unit 13 is assembled in the motor vehicle body.

The closing member 66 has a flange portion 68, a large diameter portion 70 continued from the flange portion 68, and a closing shaft 72 that has a smaller diameter than the large diameter portion 70. While the closing member 66 is plugged in the connector 16, the O-rings 22, 22 or the bush 24 and the O-rings 22, 22 as sealing member are fitted air-tightly on an outer peripheral surface of the closing shaft 72 and thereby an opening or through-bore of the connector 16 for connecting with the mating pipe 10 is closed.

On each of a pair of the connectors 16, 16, a checker member (here, made of resin) 74 is mounted or installed before the piping unit 13 is assembled in the motor vehicle.

The checker member 74 is configured to be disengaged or removed from the connector 16 when the connector 16 is connected with the mating pipe 10 correctly. Therefore, correct connection of the connector 16 and the mating pipe 10 may be verified by removing the checker member 74 or collecting the checker member 74.

Figure 8:
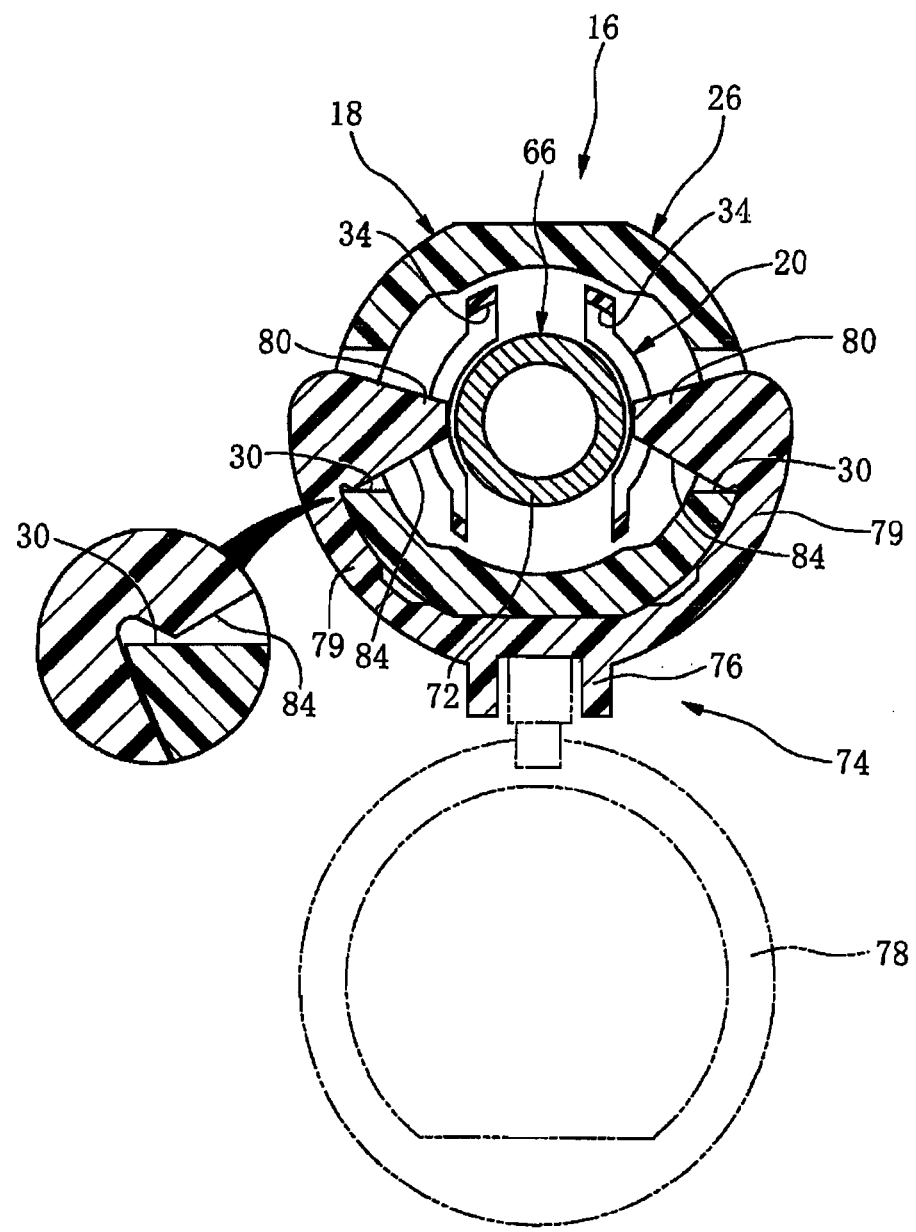
FIG. 8 is a sectional view taken along A-A line in FIG. 7.
Figure 9A:
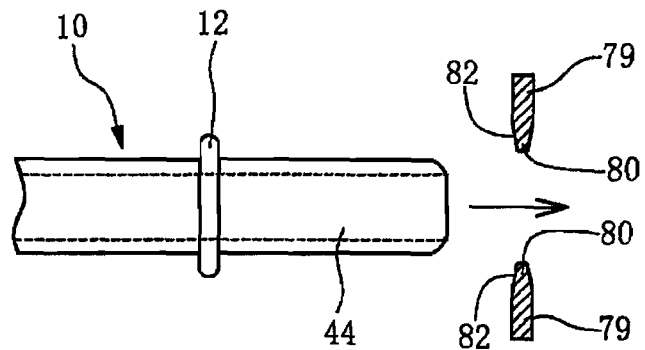
FIG. 9 (A) is an explanatory view of an action when the mating pipe is connected to the connector, and showing a state just before the mating pipe is inserted in the connector.
Figure 9B:
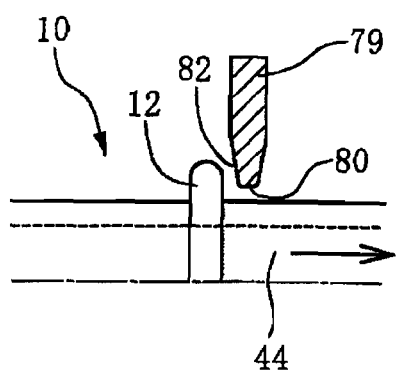
Figure 9C:
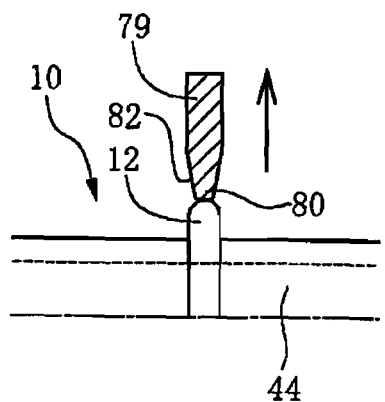
Figure 9D:
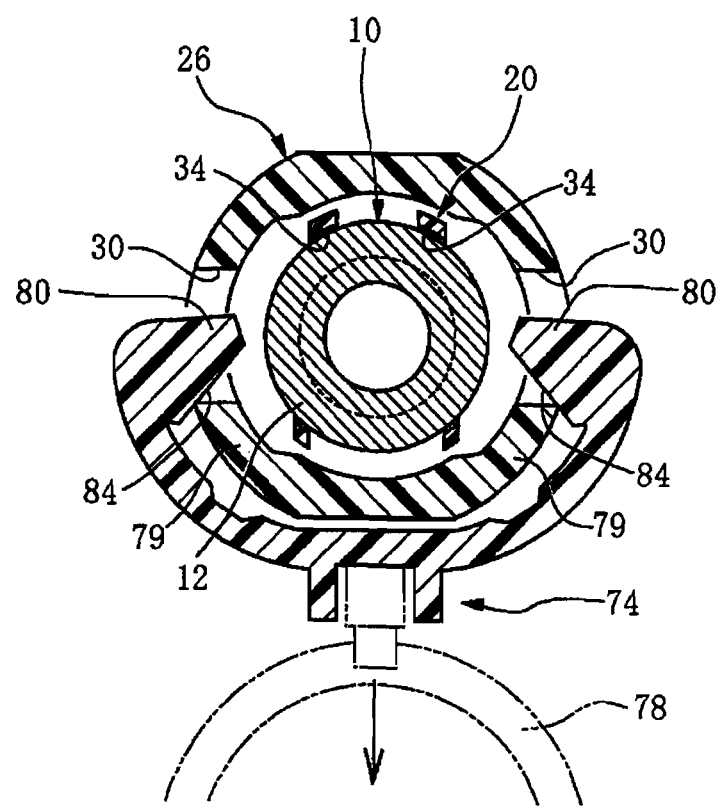

FIGS. 6 and 8 show a construction of the checker member 74 concretely.

As shown in the figures, the checker member 74 has a base portion 76 of rectangular or oblong shape. The base portion 76 is formed integrally with a circular knob 78.

The base portion 76 further has a pair of resilient arms 79, 79 on the other side of the knob 78. The resilient arms 79, 79 extend in semiannular shape or arcuate shape as a whole, and are formed integrally with stop claws 80, 80 that are directed inwardly facing each other on end portions of the resilient arms 79, 79.

Each of the stop claws 80 includes front and rear surfaces, namely front and rear surfaces in an inserting direction of the mating pipe 10, in a radially inner end, that define slant surfaces 82, 82. And, as shown in FIG. 8, each of the stop claws 80 further includes one circumferential surface that defines a slant surface 84.

The base portion 76 is further formed integrally with clip portions 86, 88 on rear and front end portions thereof (left end portion and right end portion in FIG. 6), on a side of the stop claws 80. The clip portions 86, 88 clip the large-diameter retainer holding portion 26 of the connector 16 from front and rear sides.

Here, one clip portion 86 is formed with a dent 90.

The checker member 74 functions in a following manner.

FIG. 8 shows a state that the checker member 74 is mounted or installed on the connector 16.

When the checker member 74 is mounted on the connector 16, the pair of stop claws 80, 80 of the checker member 74 enter in the windows 30 of the connector body 18 while engaging with circumferential edge portions of the windows 30. Under this engaging force, the checker member 74 is fixed and retained on the connector 16.

At that time, as shown in FIG. 7, the pair of clip portions 86, 88 clip the large diameter retainer holding portion 26 of the connector body 18 from front and rear sides, namely in the axial direction, while latching the dent 90 formed on the one clip portion 86 onto a trailing end (a proximal end or axially outer end) of the retainer holding portion 26.

When the mating pipe 10 is inserted within the connector 16 in this state, as shown in FIGS. 9 (A) and 9 (B), the engaging projection 12 abuts with the slant surfaces 82, 82 of the pair of the stop claws 80, 80, and thereby the pair of the resilient arms 79, 79 and the stop claws 80, 80 are forcibly widened or spread apart. This state is shown in FIG. 9 (C).

When go into this state, the slant surfaces 84, 84 of the stop or latching claws 80, 80 are lodged on circumferential edge portions (for example, outer ends of the edge portions) of the window 30, namely, engagement (stop engagement) of the pair of the stop claws 80, 80 with the circumferential edge portions of the window 30 is released or cancelled. And, the checker member 74 is easily removed from the connector 16 by pulling down (downwardly in FIG. 9 (D)) the knob 78 by hand (refer to FIG. 9 (D)).

The pair of the stop claws 80, 80 of the checker member 74 are located just in the positions (axial positions) of the engaging recessed portions 34, 34 of the retainer 20. Therefore, removal of the checker member 74 from the connector 16 indicates that the engaging projection 12 of the mating pipe 10 is surely fitted in the engaging recessed portions 34, 34 of the retainer 20.

Namely, this indicates that the mating pipe 10 is surely connected to the connector 16.

EXAMPLE

A test is conducted in a following procedure with respect to examples and comparison examples of the resin tube 14 in order to clarify a relationship between the bending breaking resistance and a ratio of an outer diameter (od)/a wall-thickness (t)(wall-thickness ratio) in the resin tube 14.

Here, examples and comparison examples of resin tube 14 have the same outer diameter (od) of 4 mm (except for comparison example No. 6), but varied wall-thickness (t). Each of them is bent at 900, while being held at both ends by the fixing clamps 48, 48.

Then, the fixing clamps 48, 48 are rearranged a shorter distance apart on each of them to hold it. And, each of them is bent again at 90° in a similar way, while being held by the fixing clamps 48, 48.

The above is repeated until the resin tube is broken (buckled or kinked), and searched is a minimum bend R (radius or curvature radius) that does not cause breakage with respect to each of the samples and the comparison samples. Here, the bend R is a curvature radius at an inside of a bent portion of the outer layer (refer to reference character R in FIG. 1 (B)).

At the same time, connector force-fit test is conducted to confirm force-fit workability (insertability) for the connector 16.

The resin tube is preliminary diametrically enlarged at an end portion and then the connector 16 is force-fitted in the end portion of the resin tube.

Figure 10:
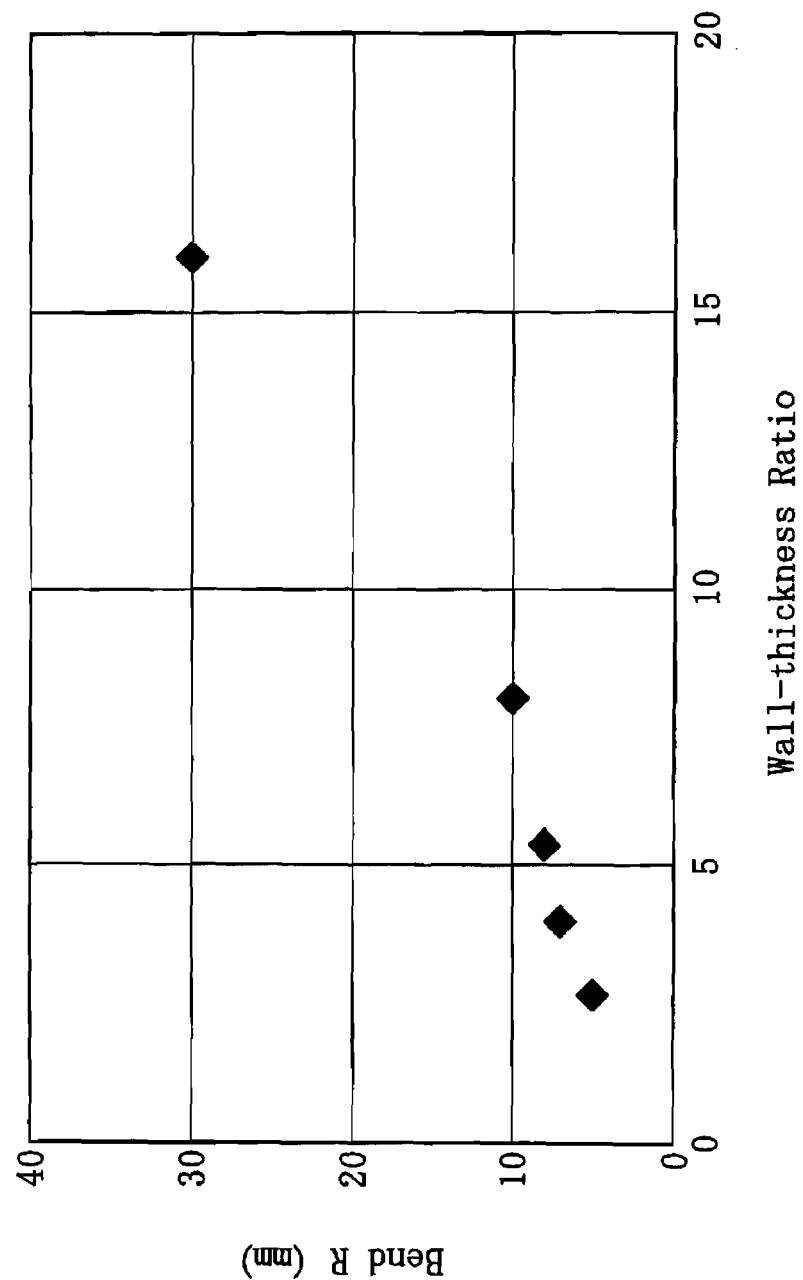
FIG. 10 is a view showing a relationship between a bend R and a wall thickness ratio of the resin tube in the one embodiment according to the present invention.
Figure 11A:
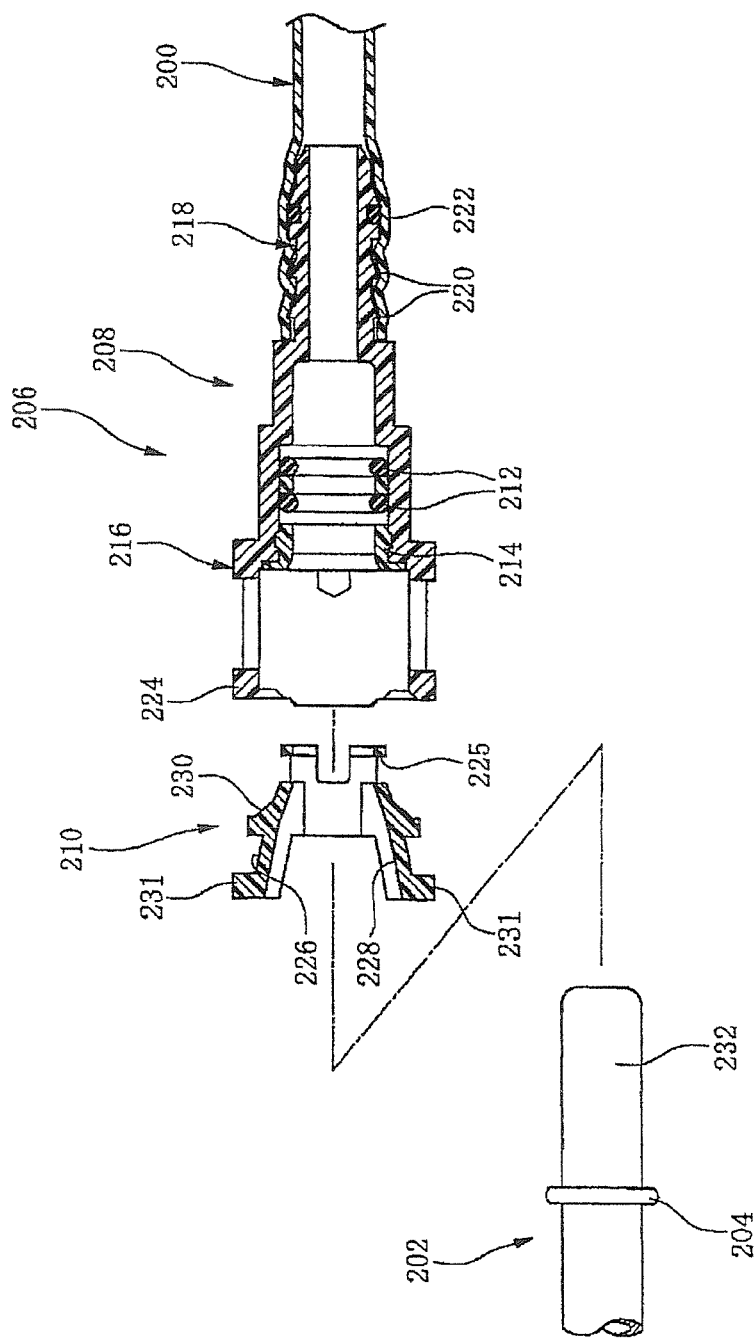
FIG. 11 (A) is a view showing a conventional example of connection of a piping unit by means of a connector.
Figure 11B:
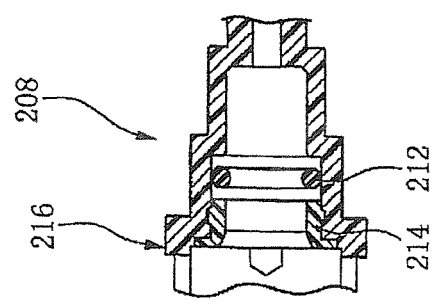
Figure 12A:
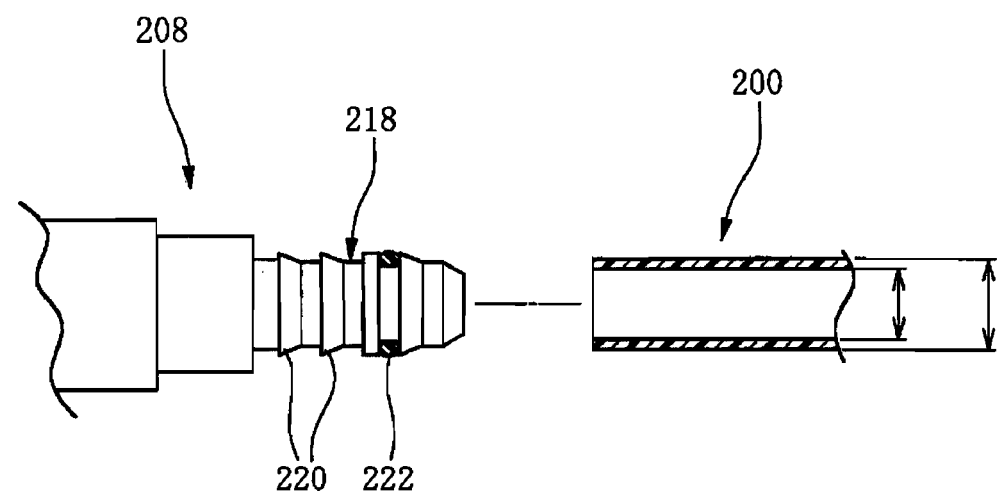
FIG. 12 (A) is a view of a relevant part of the connector of FIG. 11 along with a resin tube, and showing a state before the connector is force-fitted in the resin tube.
Figure 12B:
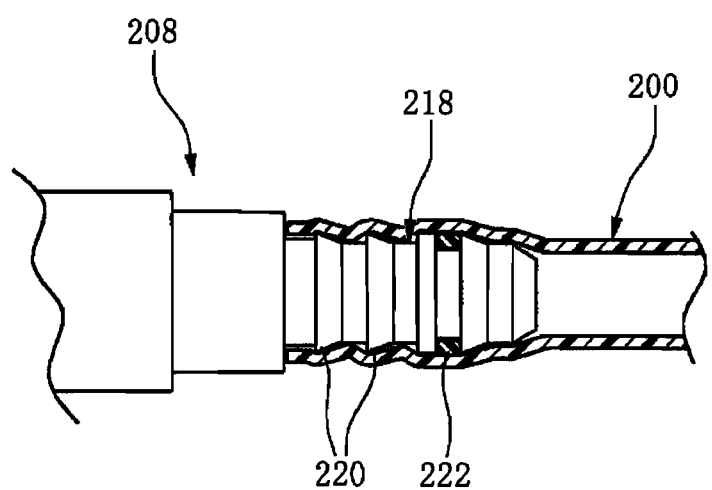
Figure 13:
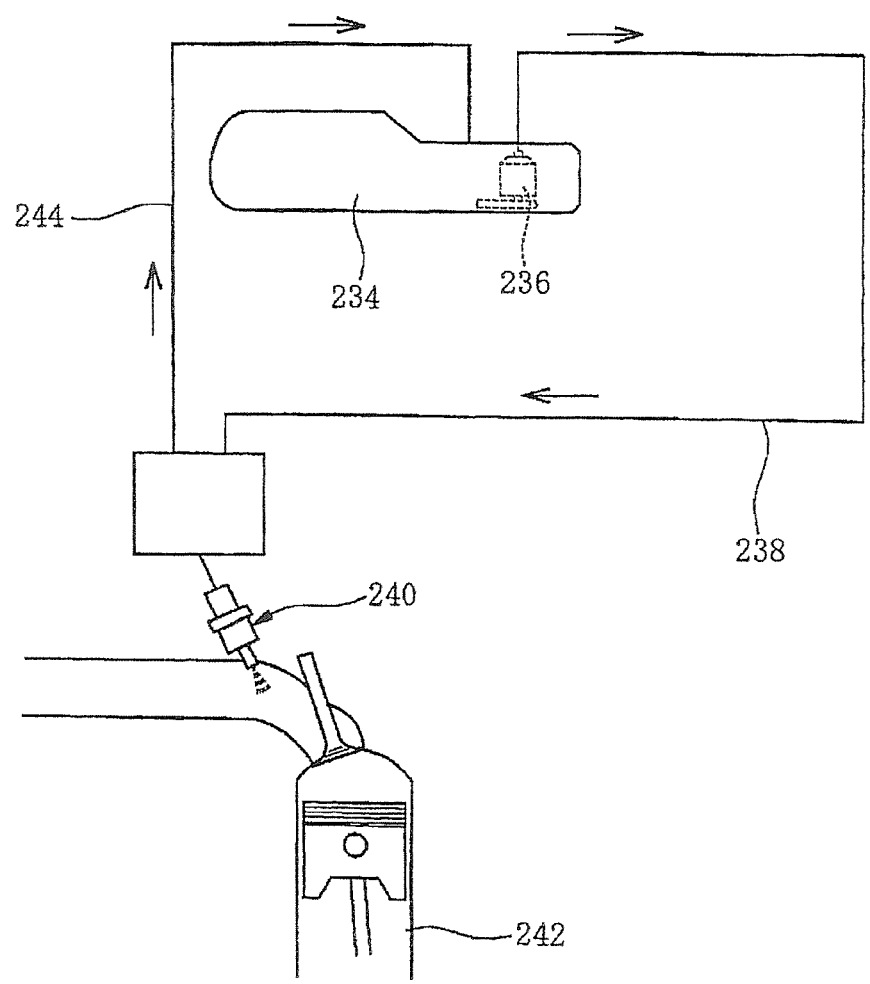
FIG. 13 is a schematic view of a return fuel system.

The test results are shown in Table 1 and FIG. 10.

In the Table 1, Nos. 2 to 4 are examples with respect to the present invention, and No. 1, No. 5 and No. 6 are comparison examples.

The examples and the comparison examples have the same multilayered construction as the resin tube 14, except for dimensions (refer to FIG. 5 (B)). Regarding the examples and comparison examples, an "outer diameter" indicates the outer diameter of a PA outer layer, and a "wall-thickness" indicates the wall-thickness of an ETFE inner layer (innermost layer) and the PA outer layer.

tor's view such as a remote part in the motor vehicle body, the operator can easily verify a correct connection by removing or collecting the checker member 74.

According to the present embodiment, the closing member 66 is mounted on or attached to a connecting opening or through-bore of the connector 16 so as to close the connecting opening or through-bore before the connector 16 is connected to the mating pipe 10. Thereby it may be favorably prevented that dust or other foreign particle enters inside the resin tube 14 through the connector 16.

TABLE 1

| No. | Outer diameter (mm) | Wall-thickness (mm) | Construction of layers | | Ratio to wall-thickness | Bend R (mm) | Insert- ability *1) |
|---|---|---|---|---|---|---|---|
| | | | ETFE innermost layer (mm) | PA outer layer (mm) | | | |
| 1 | 4 | 0.25 | 0.1 | 0.15 | 16 | 30 | ○ |
| 2 | 4 | 0.5 | 0.13 | 0.37 | 8 | 10 | ○ |
| 3 | 4 | 0.75 | 0.2 | 0.55 | 5.3 | 8 | ○ |
| 4 | 4 | 1 | 0.27 | 0.73 | 4 | 7 | ○ |
| 5 | 4 | 1.5 | 0.4 | 1.1 | 2.7 | 5 | X |
| 6 | 8 | 1 | | | 8 | 50 | ○ |

Note
*1): With regard to "insertability", a mark "○" means that a connector is favorably force-fitted in a resin tube, and a mark "X" means that the connector is hard to be force-fitted in the resin tube.

As understood from the results, with decrease of the ratio of the outer diameter (od) to the wall-thickness (t) (the outer diameter (od)/the wall-thickness (t)), the value of bend R in the table 1 becomes small, namely, a resin tube becomes hard to be broken.

However, in case where the ratio of the outer diameter (od) to the wall-thickness (t) is too small, insertability of the connector 16 is deteriorated.

It is understood from the result of Table 1 and FIG. 10, in view of resistance to breakage of the resin tube and insertability of the connector 16, the ratio of outer diameter (od) to wall thickness (t) is suitably in the range of 4 to 8.

The comparison example No. 6 satisfies the condition of the ratio of the outer diameter (od) to the wall thickness (t) in the range of 4 to 8, but has a large value of 50 relative to bend R. Namely, the comparison example No. 6 is broken (buckled) very easily.

This result is explained as follows. When a resin tube is bent at certain bend R, namely at certain curvature radius, the larger outer diameter the resin tube has, the more sharply outer and inner peripheral sides are bent, specifically the more sharply the inner peripheral side is bent. Further, due to the large diameter, resistance to breakage of the comparison example No. 6 is lowered.

According to the above embodiment, the connector 16 allows an operator to easily connect the mating pipe 10 and the piping unit 13 with a little labor, and the resin tube 14 may be favorably prevented from being broken when a bending force is exerted on the resin tube 14, by limiting the ratio of the outer diameter (od) to the wall-thickness (t) within the range of 4 to 8. And, thereby the resin tube 14 may be easily assembled in a motor vehicle body while bending the resin tube 14.

And, according to the present embodiment, the checker member 74 is mounted or installed to the connector 16 before the mating pipe 10 is inserted in the connector 16. Thereby it is not required to verify connection or connecting status of the connector 16 with the mating pipe 10 visually or by visual observation during assembly of the piping unit 13. In case where connecting work is done for a place beyond an opera- The connectors 16 and the closing members 66 may be attached or mounted to both end portions of the resin tube 14. When one closing member 66 is removed from one of the connectors 16 on both ends of the resin tube 14 and only the other closing member 66 is left on the other of the connectors 16, the operator can easily verify whether there is leakage at a joint area (connecting area) between the connector 16 and the resin tube 14 or in the connector 16 and the resin tube 14 by exerting a pressure inside the resin tube 14 through an open end of the one connector 16.

Further, in the present embodiment, a small diameter resin tube with outer diameter or outer diameter (od) up to 6 mm is adapted for the resin tube 14 of the piping unit 13. When such small diameter tube is used for piping of a returnless fuel system, a flow velocity of transporting a fuel does not become slow. This restrains a temperature increase of a fuel fluid inside the resin tube 14. Therefore, the resin tube 14 is suitably adapted for piping of such returnless fuel system.

Figure 14A:
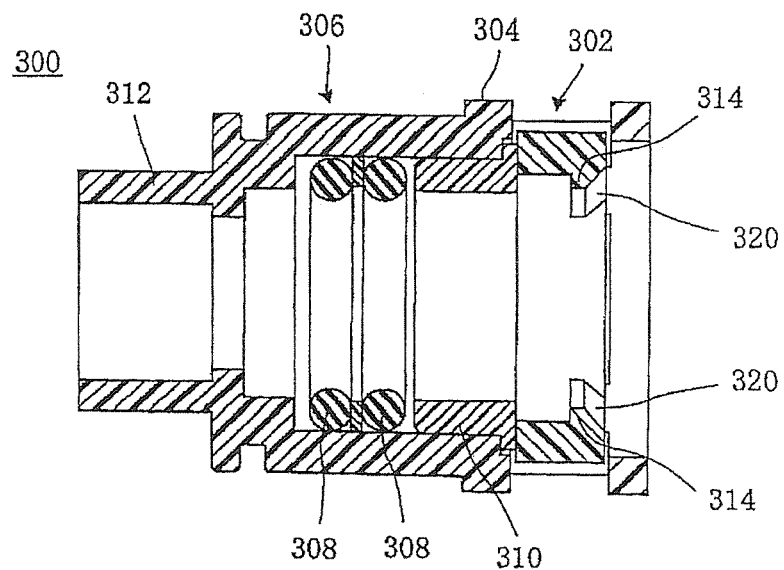
FIG. 14 (A) is a sectional view of another connector.
Figure 14B:
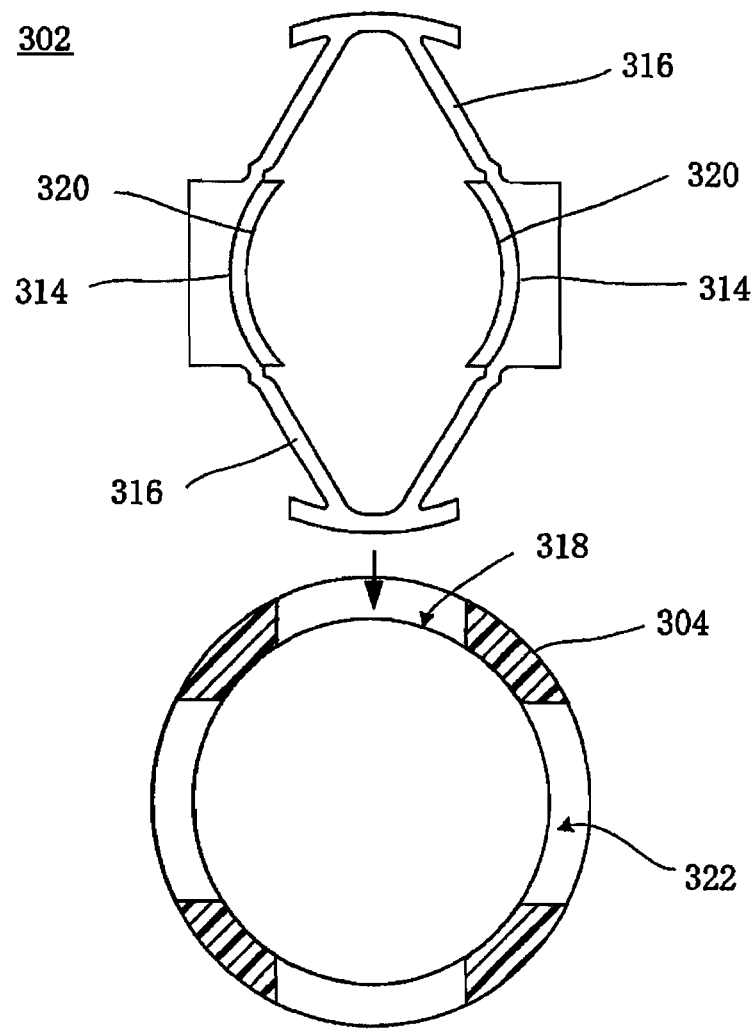
Figure 15:
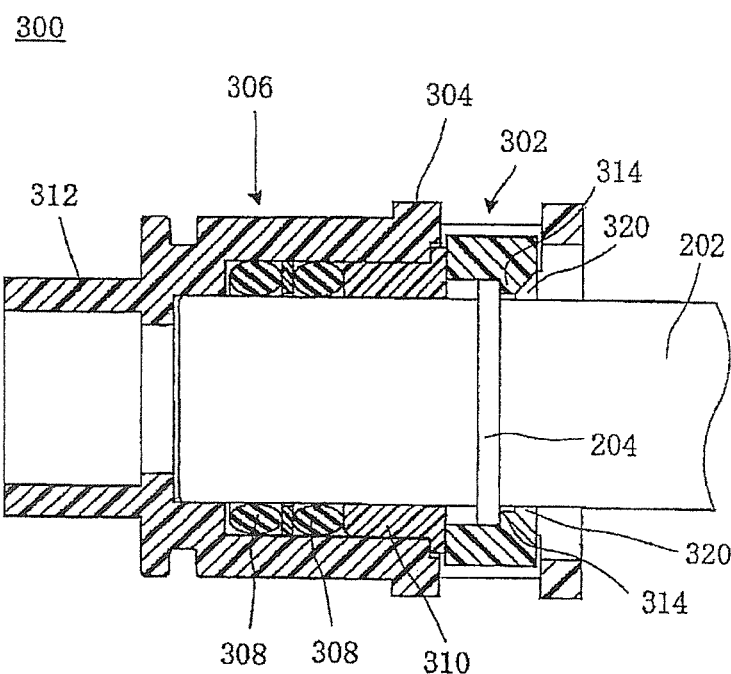
FIG. 15 is a sectional view showing a state that the another connector is connected to a mating pipe.
Figure 16:
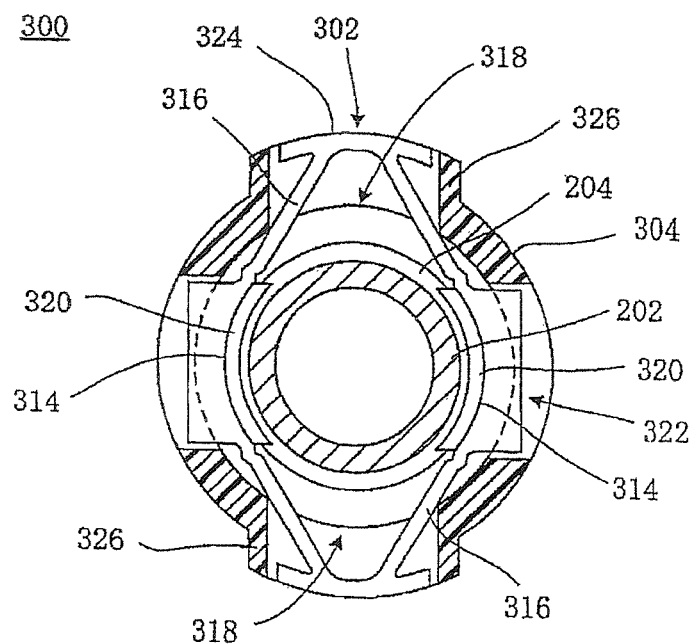
FIG. 16 is another sectional view showing the state that the another connector is connected to the mating pipe.
Figure 17:
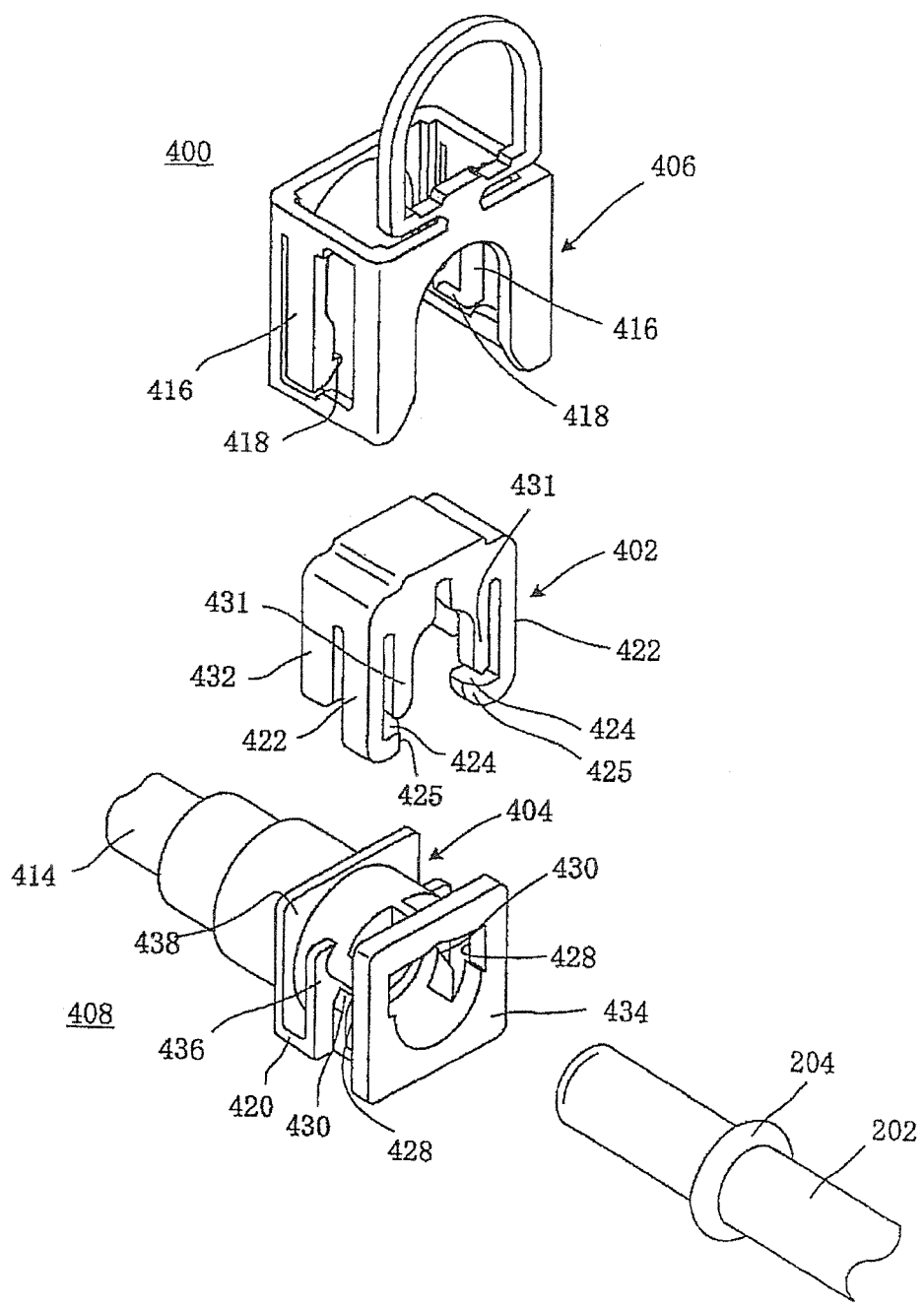
FIG. 17 is an exploded perspective view of yet another connector.
Figure 18A:
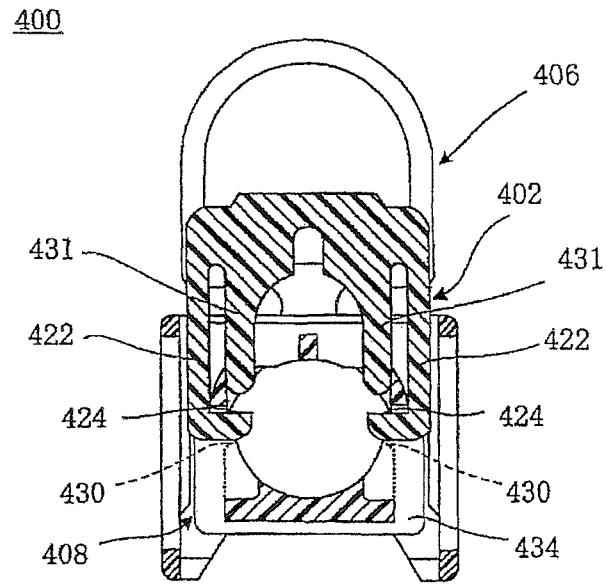
FIG. 18 (A) is a sectional view of the yet another connector.
Figure 18B:
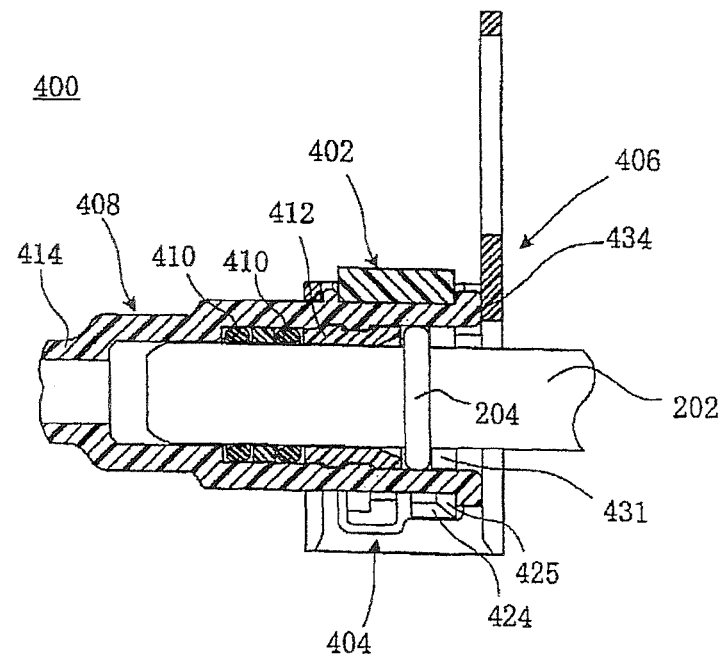

A connector, which has a retainer that is deformable resiliently in a radial direction, may be adapted for being attached to each of (or one of) both end portions of the resin tube 14. The retainer may be configured separately from, unitary with or integrally with a connector body. In the connector that is used in embodiments according to the present invention, when the mating pipe 10 is inserted in the connector body, the retainer is pushed by the engaging projection 12 of the mating pipe 10, is deformed once in a radial direction (for example, deformed so as to expand in the radial direction), then is returned resiliently to its original shape to engage with the engaging projection 12 of the mating pipe 10. As a result, the connector body is securely fixed with the mating pipe 10 in an axial direction. For example, may be adapted the connector 300 shown in FIG. 14 wherein the retainer 302 is mounted or incorporated in the retainer holding portion 304, for example, as a unit. Or, may be also adapted the connector 400 shown in FIG. 17 wherein the retainer 402 is allowed to be pushed with respect to the retainer holding portion 404 only when the mating pipe 202 or the mating pipe 10 is completely inserted in the connector 400. When the connector 300 or the connector 400 is adapted, the connecting portion 312 or the connecting portion 414 is configured suitably to be fitted in the resin tube 14 (for example, as a force-fit portion).

Although the preferred embodiments have been described above, these are only some of embodiments of the present invention. The present invention may be constructed and embodied in various configurations and modes within the scope of the present invention.

What is claimed is:

1. A fuel piping assembly, comprising:
a piping unit for transporting a fuel; and
fixing clamps for supporting the piping unit;
wherein the piping unit has a resin tube, and
a connector attached to an end portion of the resin tube for connecting the resin tube to a mating pipe, the connector having a connector body including a retainer holding portion on one end of the connector body along an axial direction of the connector body and a tube connecting portion on the other end of the connector body along the axial direction for connecting to the resin tube, a retainer held in or on the retainer holding portion for engaging with the mating pipe to securely fix the connector body in the axial direction, and a sealing member for providing a seal between the connector body and the mating pipe,
wherein the resin tube has a multilayered construction including an inner fuel barrier layer and an outer layer made of polyamide covered further with a protective layer on an outer peripheral surface of the outer layer, the resin tube inside the protective layer having a small outer diameter (od) up to 6 mm and a wall-thickness (t), a ratio of the outer diameter (od) of the resin tube/the wall thickness (t) of the resin tube being in a range of 4 to 8,
wherein the resin tube which is flexible throughout is bent in arcuate shape at a plurality of bent points along a longitudinal direction of the resin tube and along a motor vehicle body, and both side portions of each of the plurality of the bent points being supported by a pair of the fixing clamps which are unconnected and separated from one another, the fixing clamps being positioned and attached to the motor vehicle body to define the ends of the bent points without any additional support for the bent points between the fixing clamps, each of the fixing clamps of the both side portions of each of the bent points being fastened to a different point of the motor vehicle body,
whereby the lengths and curvatures of the bent points and the positions of the ends of the bent points can be adjusted between the fixing clamps,
wherein each fixing clamp has a tube holding portion and a mounting portion for securely fixing the tube holding portion to the motor vehicle body, the mounting portion having an insert portion which is inserted in a holding bore in the motor vehicle body, an outside pinching portion which is formed integrally on an outer end portion of the insert portion to be located adjacent to an outer surface of the motor vehicle body, and an inside pinching portion which is formed integrally on an inner end portion of the insert portion to be located adjacent to an inner surface of the motor vehicle body, and
wherein the inside pinching portion includes foot portions on both lateral sides of the inner end portion of the insert portion and turned-back portions, each of the foot portions extending in a laterally outward direction at an angle toward the inner surface of the motor vehicle body, and each of the turned-back portions extending in a laterally inward direction from a laterally outer end of the foot portion at an angle toward an outer side of the motor vehicle body;
wherein all of the fixing clamps open in the same orientation with respect to the resin tube along the motor vehicle body.

2. The fuel piping assembly as set forth in claim 1, wherein each of the turned-back portions of the inside pinching portion engages with an inner edge of the holding bore.

3. The fuel piping assembly as set forth in claim 1, wherein the outside pinching portion includes extended portions on both lateral sides of the outer end of the insert portion, and each of the extended portions extending in a laterally outward direction at an angle toward an outer surface of the motor vehicle body.

4. The fuel piping assembly as set forth in claim 1, wherein a neck portion (A) is provided between the tube holding portion and the outside pinching portions.

5. A fuel piping assembly, comprising:
a piping unit for transporting a fuel; and
fixing clamps fixing the piping unit to a motor vehicle body;
wherein the piping unit has a resin tube, and a connector attached to an end portion of the resin tube for connecting the resin tube to a mating pipe, the connector having a connector body including a retainer holding portion on one end of the connector body along an axial direction of the connector body and a tube connecting portion on the other end of the connector body along the axial direction for connecting to the resin tube, a retainer held in or on the retainer holding portion for engaging with the mating pipe to securely fix the connector body in the axial direction, and a sealing member for providing a seal between the connector body and the mating pipe,
wherein the resin tube has a multilayered construction including an inner fuel barrier layer and an outer layer made of polyamide covered further with a protective layer on an outer peripheral surface of the outer layer, the resin tube inside the protective layer having a small outer diameter (od) up to 6 mm and a wall-thickness (t), a ratio of the outer diameter (od) of the resin tube/the wall thickness (t) of the resin tube being in a range of 4 to 8,
wherein the resin tube which is flexible throughout, is bent in arcuate shape to provide a plurality of bent points along a longitudinal direction of the resin tube and along the motor vehicle body, both side portions of each of the plurality of the bent points being supported by a pair of the fixing clamps which are unconnected and separated from one another, the fixing clamps being positioned and attached to the motor vehicle body to define the ends of the bent points without any additional support for the bent points between the fixing clamps, each of the fixing clamps of the both side portions of each of the bent points being fastened to different points of the motor vehicle body portion by a pair of the fixing clamps;
whereby the lengths and curvatures of the bent points and the positions of the ends of the bent points can be adjusted between the fixing clamps,
wherein each fixing clamp has a tube holding portion and a mounting portion for securely fixing the tube holding portion to the motor vehicle body, the mounting portion having an insert portion which is inserted in a holding bore in the motor vehicle body, an outside pinching portion which is formed integrally on an outer end portion of the insert portion to be located adjacent to an outer surface of the motor vehicle body, and an inside pinching portion which is formed integrally on an inner end portion of the insert portion to be located adjacent to an inner surface of the motor vehicle body, and wherein the inside pinching portion includes foot portions on both lateral sides of the inner end portion of the insert portion and turned-back portions, each of the foot portions extending in a laterally outward direction at an angle toward the inner surface of the motor vehicle body, and each of the turned-back portions extending in a laterally inward direction from a laterally outer end of the foot portion at an angle toward an outer side of the motor vehicle body;

wherein all of the fixing clamps open in the same orientation with respect to the resin tube along the motor vehicle body.

6. The fuel piping assembly as set forth in claim 5, wherein the fixing clamps are C-shaped clamps with openings, and each of the openings being oriented along the motor vehicle body portion.

7. The fuel piping assembly as set forth in claim 5, wherein the fixing clamps are C-shaped clamps with openings, and each of the openings being oriented outside or inside of an arcuate shape of the bent point of the resin tube.

* * * * *